United States Patent
Muto et al.

(10) Patent No.: US 7,065,712 B2
(45) Date of Patent: Jun. 20, 2006

(54) SCHEME FOR POSTING ADVERTISEMENTS ON COMPREHENSIVE INFORMATION VIEWING DEVICE

(75) Inventors: Tetsuyuki Muto, Kunitachi (JP); Masakazu Kanbe, Kokubunji (JP); Jin Hiwatashi, Sakura-shin-machi (JP); Katsuya Arai, Sayama (JP); Atsushi Kanai, Yokohama (JP); Kaku Takeuchi, Kokubunji (JP); Toru Kawamura, Yokohama (JP); Tomotaka Uchihashi, Yokohama (JP)

(73) Assignee: Nippon Telegraph and Telephone Corp., Tokyo (JP)

( * ) Notice: Subject to any disclaimer, the term of this patent is extended or adjusted under 35 U.S.C. 154(b) by 547 days.

(21) Appl. No.: 09/943,601

(22) Filed: Aug. 30, 2001

(65) Prior Publication Data
US 2002/0027570 A1     Mar. 7, 2002

(30) Foreign Application Priority Data
Sep. 1, 2000  (JP) ............................ P2000-266273
Jun. 22, 2001 (JP) ............................ P2001-189903

(51) Int. Cl.
*G06F 3/00* (2006.01)

(52) U.S. Cl. ...................... 715/760; 715/789; 715/790; 715/802; 715/808; 715/809; 715/811

(58) Field of Classification Search ................. 345/700, 345/802, 782, 760, 764; 715/501, 700, 802, 715/760, 764, 782, 789, 790, 809, 811
See application file for complete search history.

(56) References Cited

U.S. PATENT DOCUMENTS

| | | | |
|---|---|---|---|
| 6,177,936 B1 * | 1/2001 | Cragun | 345/760 |
| 6,229,542 B1 * | 5/2001 | Miller | 345/782 |
| 6,351,775 B1 * | 2/2002 | Yu | 709/238 |
| 6,405,222 B1 * | 6/2002 | Kunzinger et al. | 715/501.1 |
| 6,515,656 B1 * | 2/2003 | Wittenburg et al. | 345/853 |
| 6,570,595 B1 * | 5/2003 | Porter | 345/802 |
| 6,748,426 B1 * | 6/2004 | Shaffer et al. | 709/219 |
| 6,754,693 B1 * | 6/2004 | Roberts et al. | 709/205 |
| 6,928,615 B1 * | 8/2005 | Haitsuka et al. | 715/738 |
| 2002/0113820 A1 * | 8/2002 | Robinson et al. | 345/764 |

FOREIGN PATENT DOCUMENTS

| | | |
|---|---|---|
| JP | 9-269923 | 10/1997 |
| JP | 11-85783 | 3/1999 |
| JP | 11-134353 | 5/1999 |
| JP | 11-312190 | 11/1999 |
| JP | 11-328219 | 11/1999 |
| JP | 2000-99232 | 4/2000 |
| JP | 2001-118006 | 4/2001 |

* cited by examiner

*Primary Examiner*—Weilun Lo
*Assistant Examiner*—Mylinh Tran
(74) *Attorney, Agent, or Firm*—Kilpatrick Stockton LLP

(57) ABSTRACT

An advertisement posting scheme utilizes a comprehensive information viewing device capable of displaying multiple Web pages on a display screen by enlarging or contracting each Web page at arbitrary magnification rate smoothly, rotating each Web page at arbitrary angle smoothly, arbitrarily varying and controlling transparency level of a plurality of Web pages that are arranged in superposition such that any overlapped hidden portion can be made visible, and three-dimensionally arranging the multiple Web pages such that the multiple Web pages can be viewed from arbitrary angle, for the purpose of displaying advertisements on the display screen at arbitrary positions, angles, sizes and transparency levels, in relation to the multiple Web pages.

30 Claims, 20 Drawing Sheets

FIG.7

ADVERTISEMENT INFORMATION DATABASE RECORD

| CONTENTS | ATTRIBUTE INFORMATION | OVERLAY INFORMATION PROVIDER | ADVERTISEMENT DATA |
|---|---|---|---|
| REAL TIME EMPLOYMENT INFORMATION SERVICE | JOB INFORMATION | TELEMATE Inc. | http://ad.telemate.com/ |
| REAL TIME STOCK INFORMATION SERVICE | MARKET INFORMATION | TELESTOCKEXCHANGE Corp. | http://ad.telestock.com/ |
| AKIHABARA HOT LINE | MERCHANDISE SALES PRICE INFORMATION | TELEAKIHABARA Inc. | http://ad.teleakihabara.com/ |
| USED CAR AUCTION | AUCTION INFORMATION | TELESECONDHAND Inc. | http://ad.telesecondhand.com/ |

FIG.8

WEB PAGE ATTRIBUTE INFORMATION DATABASE RECORD

| URL | ATTRIBUTE INFORMATION #1: CLASSIFICATION | ATTRIBUTE INFORMATION #2: UPDATE DATE | ATTRIBUTE INFORMATION #3: SITE SIZE | ATTRIBUTE INFORMATION #4: POPULARITY | ATTRIBUTE INFORMATION #5: SPONSOR | WEB PAGE INFORMATION PROVIDER INFORMATION |
|---|---|---|---|---|---|---|
| http://www.autoinfo.com/ | CARS | 1969/07/21 | LARGE | MIDDLE | INDIVIDUAL | SHOTARO KOBAYASHI |
| http://www.telestock.com/ | STOCKS | 2000/07/03 | SMALL | LOW | CORPORATION | TELESTOCK Corp. |
| http://www.recruite-info.com/ | JOB CHANGE ANECDOTE | 1989/01/31 | MEDIUM | HIGH | INDIVIDUAL | JUNTARO SHOKUBA |
| http://www.pcinfo.com/ | PC INFORMATION | 2000/07/03 | LARGE | MIDDLE | CORPORATION | AKIHABARA CHAMBER OF COMMERCE & INDUSTRY |

FIG.9

(a) OVERLAY INFORMATION DATABASE RECORD

| CONTENTS | ATTRIBUTE INFORMATION | OVERLAY INFORMATION STORAGE SITE | OVERLAY INFORMATION PROVIDER |
|---|---|---|---|
| REAL TIME POPULARITY INFORMATION | USER TRAFFIC INFORMATION | http://ovdata.infogather.com/ | InfoGather Inc. |
| SEARCH ROBOT TRACKING SERVICE | WEB ROBOT TRACKING INFORMATION | http://ovdata.goo.com/ | GOO Inc. |
| LINK VISUALIZATION SERVICE | HYPERLINK | http://ovdata.dynamiclink.com/ | DYNAMIC LINK Inc. |

(b) OVERLAY INFORMATION (USER TRAFFIC INFORMATION)

| SOURCE | DESTINATION | NUMBER | TRANSFERRED USERS | | | |
|---|---|---|---|---|---|---|
| | | | USER ATTRIBUTE | | | |
| | | | MR. A'S ATTRIBUTE | MR. B'S ATTRIBUTE | MR. C'S ATTRIBUTE | ... |
| | | | MR. X'S ATTRIBUTE | MR. Y'S ATTRIBUTE | — | — |
| URL 0 | URL 1 | 10 | | | | |
| URL 0 | URL 2 | 2 | | | | |
| | | | | | | |
| | | | | | | |
| | | | | | | |

| URL ID | URL |
|---|---|
| URL 0 | http://www.autoinfo.com/ |
| URL 1 | http://www.telestock.com/ |
| URL 2 | http://www.recruiteinfo.com/ |
| URL 3 | http://www.pcinfo.com/ |

SCHEME FOR POSTING ADVERTISEMENTS ON COMPREHENSIVE INFORMATION VIEWING DEVICE

BACKGROUND OF THE INVENTION

1. Field of the Invention

The present invention relates to a scheme for posting advertisements in relation to Web pages on a display screen of a comprehensive information viewing device capable of displaying multiple Web pages simultaneously such as that disclosed in Japanese Patent Application Laid Open No. 2000-099232.

2. Description of the Related Art

Conventionally, an advertisement is posted on a Web page by securing a region for an advertisement within a window for displaying the Web page and displaying a banner advertisement in that region, or by opening another window separately from the Web page and displaying an advertisement within that another window.

However, among these conventional advertisement posting schemes, a scheme for displaying a banner advertisement has been associated with a problem that the Web page contents display region becomes smaller because the Web page contents display region and the advertisement display region must coexist within the same window, as well as a problem that it is difficult to provide a large advertisement display region.

Also, a scheme for displaying the advertisement within another window has been associated with a problem that a region in which the Web page window can be displayed becomes smaller within a total display region of the information viewing device because there is a need to provide a separate advertisement window.

On the other hand, there has been a Web page image formation system for forming images of multiple Web pages acquired from Web servers and presenting them to client systems, which is intended to be applied to on-line services using multiple Web page images through a computer network such as an on-line shopping service using multiple product Web pages and an image library service using multiple image Web pages, for example. This Web page image formation system forms images of desired Web pages acquired by accessing to Web servers through the Internet by using a Web browser according to the need in response to Web page image requests from client systems, and presents these Web page images to the client systems.

FIG. 1 shows a conventional Web page image formation system for providing a service using formation of images of multiple Web pages, in which a single system 101 requiring formation of Web page images acquires multiple Web pages from a plurality of Web servers 103, forms their images, and displays these multiple Web page images on a display 105.

In this conventional Web page image formation system, the acquisition and image formation of multiple Web pages are carried out by a single system 101, so that there has been a problem that the system load becomes high.

Namely, there are also a problem that the network traffics are concentrated as multiple Web pages must be acquired, and a problem that the system processing load becomes high as images of multiple Web pages must be formed.

In addition, the specifications related to the WWW are frequently extended while the specifications related to HTML, style sheet, XML, etc. are frequently updated, so that there is a need for frequent version up of the Web page image formation processing unit in order to deal with such extensions or updates of the specifications. However, this would make the system running extremely tedious especially in the case of distributing the system to a user where it is necessary to require the user of the system to carry out the version up operation. Thus there is a problem that modifications are required whenever the latest WWW specifications are to be accounted for.

BRIEF SUMMARY OF THE INVENTION

It is therefore an object of the present invention to provide an advertisement posting scheme capable of posting advertisements effectively, without hampering the Web page readability, by utilizing the comprehensive information viewing scheme for the advertisement posting.

It is another object of the present invention to provide a Web page image formation scheme capable of reducing the system load and accounting for the latest WWW specifications appropriately by distributing the Web page acquisition and image formation processing and utilizing the existing Web browser.

According to one aspect of the present invention there is provided a method for posting advertisements, comprising the steps of: (a) displaying multiple Web pages on a display screen of a comprehensive information viewing device capable of enlarging or contracting each Web page at arbitrary magnification rate smoothly, rotating each Web page at arbitrary angle smoothly, arbitrarily varying and controlling transparency level of a plurality of Web pages that are arranged in superposition such that any overlapped hidden portion can be made visible, and three-dimensionally arranging the multiple Web pages such that the multiple Web pages can be viewed from arbitrary angle; and (b) displaying advertisements on the display screen of the comprehensive information viewing device at arbitrary positions, angles, sizes and transparency levels, in relation to the multiple Web pages displayed by the step (a).

According to another aspect of the present invention there is provided a system for posting advertisements, comprising: a Web page display unit configured to display multiple Web pages on a display screen of a comprehensive information display device capable of enlarging or contracting each Web page at arbitrary magnification rate smoothly, rotating each Web page at arbitrary angle smoothly, arbitrarily varying and controlling transparency level of a plurality of Web pages that are arranged in superposition such that any overlapped hidden portion can be made visible, and three-dimensionally arranging the multiple Web pages such that the multiple Web pages can be viewed from arbitrary angle; and an advertisement display unit configured to display advertisements on the display screen of the comprehensive information viewing device at arbitrary positions, angles, sizes and transparency levels, in relation to the multiple Web pages displayed by the Web page display unit.

According to another aspect of the present invention there is provided a comprehensive information display device, comprising: a Web page display unit configured to display multiple Web pages on a display screen, which is capable of enlarging or contracting each Web page at arbitrary magnification rate smoothly, rotating each Web page at arbitrary angle smoothly, arbitrarily varying and controlling transparency level of a plurality of Web pages that are arranged in superposition such that any overlapped hidden portion can be made visible, and three-dimensionally arranging the multiple Web pages such that the multiple Web pages can be viewed from arbitrary angle; and an advertisement display unit configured to display advertisements on the display screen at arbitrary positions, angles, sizes and transparency levels, in relation to the multiple Web pages displayed by the Web page display unit.

According to another aspect of the present invention there is provided a computer usable medium having computer readable program codes embodied therein for causing a computer to function as a comprehensive information display device, the computer readable program codes include: a first computer readable program code for causing said computer to display multiple Web pages on a display screen of the comprehensive information viewing device capable of enlarging or contracting each Web page at arbitrary magnification rate smoothly, rotating each Web page at arbitrary angle smoothly, arbitrarily varying and controlling transparency level of a plurality of Web pages that are arranged in superposition such that any overlapped hidden portion can be made visible, and three-dimensionally arranging the multiple Web pages such that the multiple Web pages can be viewed from arbitrary angle; and a second computer readable program code for causing said computer to display advertisements on the display screen of the comprehensive information viewing device at arbitrary positions, angles, sizes and transparency levels, in relation to the multiple Web pages displayed by the first computer readable program code.

Other features and advantages of the present invention will become apparent from the following description taken in conjunction with the accompanying drawings.

BRIEF DESCRIPTION OF THE DRAWINGS

FIG. 7 is a diagram showing exemplary advertisement information database records that can be used in the advertisement posting system of FIG. 2.

FIG. 8 is a diagram showing exemplary Web page attribute information database records that can be used in the advertisement posting system of FIG. 2.

FIG. 9 is a diagram showing exemplary overlay information database records and overlay information that can be used in the advertisement posting system of FIG. 2.

DETAILED DESCRIPTION OF THE INVENTION

Referring now to FIG. 2 to FIG. 10, the first embodiment of an advertisement posting scheme according to the present invention will be described in detail.

Figure 2:
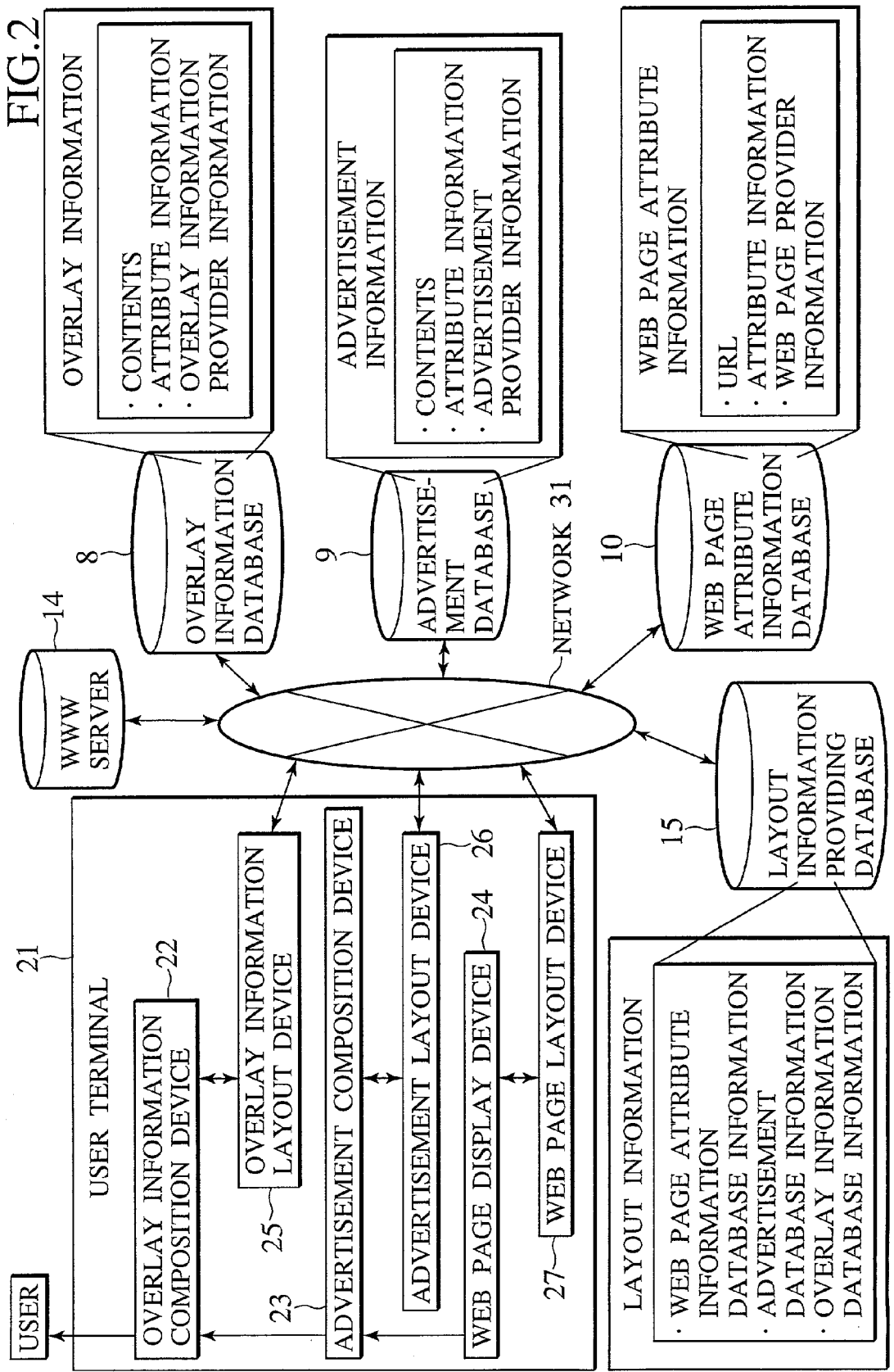
FIG. 2 is a block diagram showing an exemplary configuration of an advertisement posting system according to the first embodiment of the present invention.

FIG. 2 shows an exemplary configuration of an advertisement posting system according to the first embodiment, which comprises a user terminal 21, an overlay information database 8, an advertisement database 9, a Web page attribute information database 10, and a layout information providing database 15, which are interconnected through an Internet 31 to which a WWW server 14 is connected.

The user terminal 21 comprises an overlay information composition device 22, an advertisement composition device 23, a Web page display device 24, an overlay information layout device 25, an advertisement layout device 26, and a Web page layout device 27.

The overlay information database 8 stores contents, attribute information and overlay information provider information as overlay information.

The advertisement database 9 stores contents, attribute information and advertisement provider information as advertisement information.

The Web page attribute information database 10 stores URL, attribute information and Web page provider information as Web page attribute information.

The layout information providing database 15 stores Web page attribute information database information, advertisement database information, and overlay information database information as layout information. The layout information providing database 15 manages axes used for defining the three-dimensional space in each of the Web page attribute information database 10, the advertisement database 9 and the overlay information database 8 by using these layout information. When an attribute value of the Web page or the advertisement or the overlay information that is a layout target is received as an input, the layout information providing database 15 calculates and returns corresponding coordinate value in the three-dimensional space.

The advertisement posting system of this embodiment utilizes a multiple simultaneous Web page display viewing device as disclosed in Japanese Patent Application Laid Open No. 2000-099232 as a comprehensive information viewing device for constituting the user terminal 21, for the purpose of the advertisement posting, such that the advertisements can be posted on a display screen of this comprehensive information viewing device at arbitrary positions, angles, magnification rates and transparency levels. This comprehensive information viewing device has a mechanism for enlarging or contracting the Web page at arbitrary magnification rate smoothly, a mechanism for rotating the Web page at arbitrary angle smoothly, a mechanism for arbitrarily varying and controlling transparency levels of a plurality of Web pages that are arranged in superposition such that any overlapped hidden portion can be made visible, and a mechanism for three-dimensionally arranging multiple Web pages and controlling them such that they can be viewed from arbitrary angle.

Figure 3:
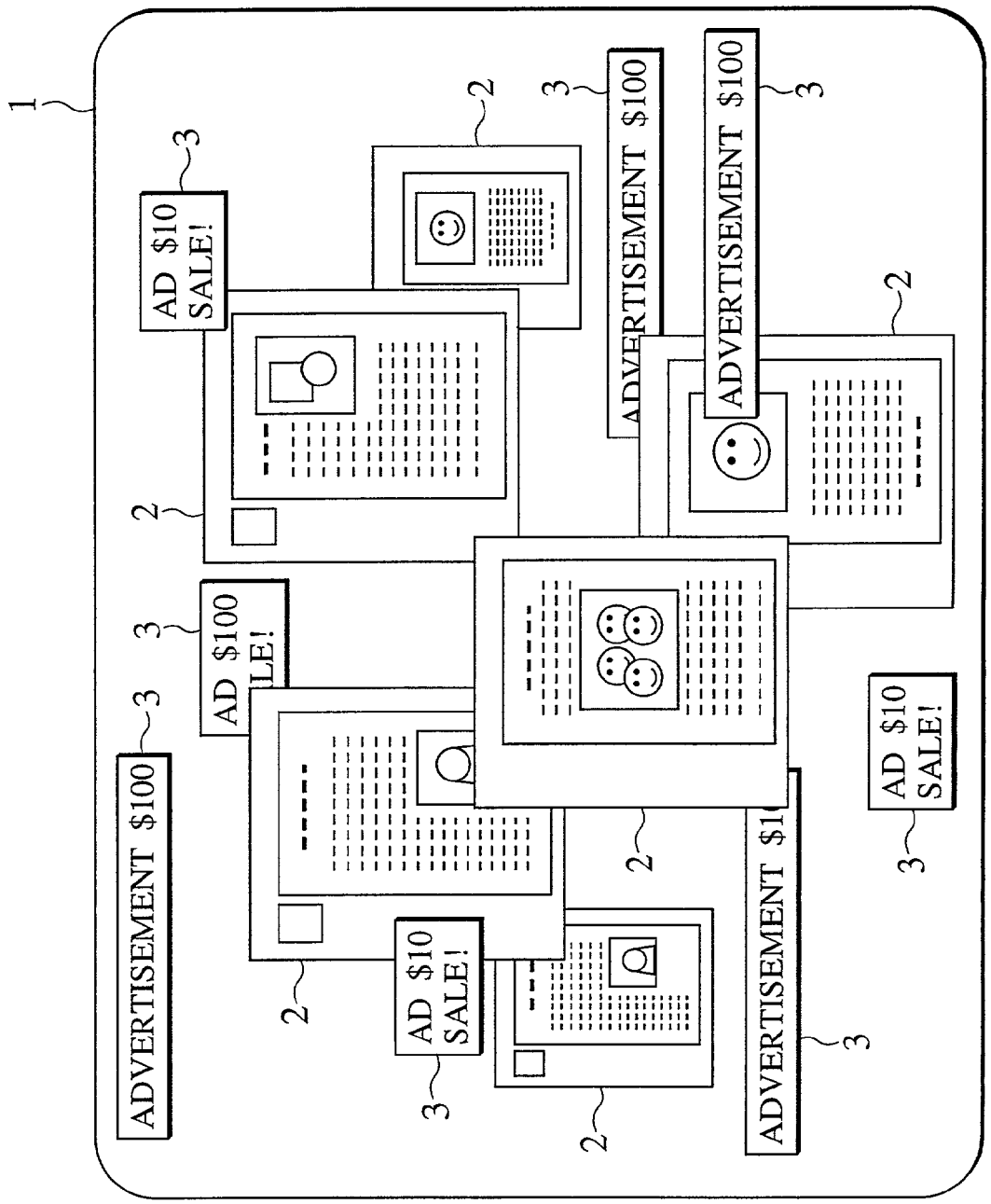
FIG. 3 is a diagram showing an exemplary display screen in which multiple Web pages and advertisements are displayed simultaneously in the advertisement posting system of FIG. 2.

In the advertisement posting system of this embodiment which utilizes the above described comprehensive information viewing device for the advertisement posting, as shown in FIG. 3, multiple advertisements 3 can be displayed at arbitrary positions, angles, sizes and transparency levels in a three-dimensional space, in relation to multiple Web pages 2 that are displayed at arbitrary positions, angles, sizes and transparency levels in the three-dimensional space of a display screen 1 of the comprehensive information viewing device. In this way, it becomes possible to post the advertisements 3 effectively, without hindering the viewing of the Web pages themselves.

Figure 4:
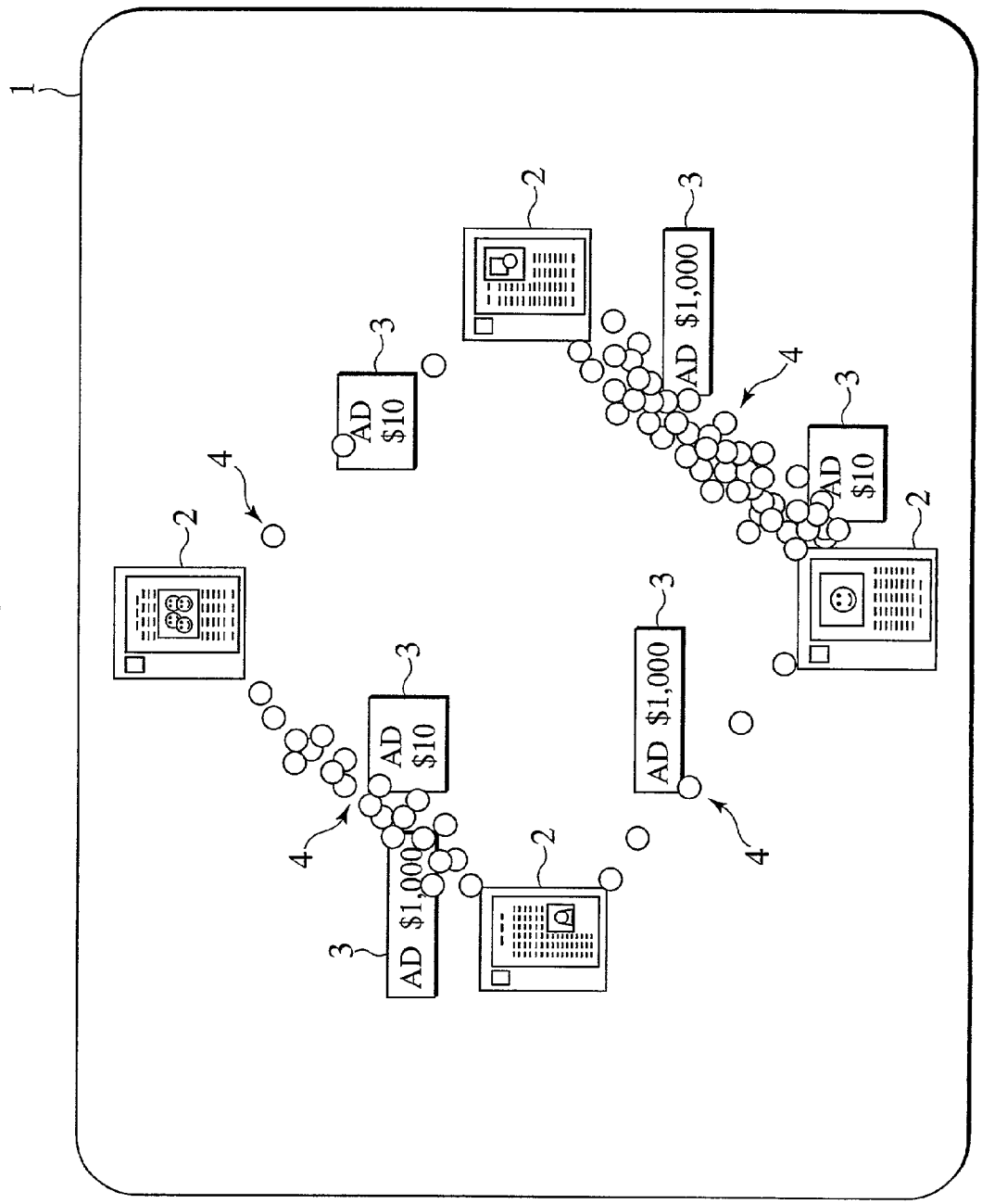
FIG. 4 is a diagram showing another exemplary display screen in which multiple Web pages, advertisements and overlay information are displayed in superposition in the advertisement posting system of FIG. 2.

In addition, as shown in FIG. 4, it is also possible to display an overlay information 4 as additional information, in superposition to the multiple Web pages 2 and the multiple advertisements 3 displayed on the display screen 1 as described above.

Here, the overlay information 4 can express the number and the attribute information of users who are making transitions between Web pages by tracing hyperlinks, for example. This overlay information 4 can be displayed in varying shapes and colors, and the flow of data can be expressed by the animation display technique.

Also, in this embodiment, the advertisements 3 can be displayed at arbitrary positions, angles, sizes and transparency levels in a three-dimensional space, in relation to the overlay information 4 as well. Here, the advertisements 3 can be displayed in animation in conjunction with the flow of data expressed by the animation display of the overlay information 4, such that it becomes possible for the user to intuitively relate the advertisements 3 and the flow of data, and thereby improving the advertisement effect on the comprehensive information viewing device.

In further detail, in the advertisement posting system of FIG. 2, the user can view a large amount of Web pages in short time by operating the user terminal 21. At the user terminal 21, the Web page display device 24 acquires the Web page display contents (HTML) by accessing the WWW server 14 through the Internet 31, and displays them in a display space. Here, at the user terminal 21, the Web page layout device 27 acquires the attribute information regarding the display positions from the Web page attribute information database 10 in order to determine the display positions in the display space of the acquired Web pages, and obtains the display positions by utilizing the layout information providing database 15. In the Web page attribute information database 10, the attribute information regarding the Web pages are stored as the Web page attribute information records using URLs of the Web pages as keys.

In the user terminal 21, the advertisement composition device 23 composes the advertisements with the Web page viewing display screen generated by the Web page display device 24 as described above, and for this purpose, the advertisement layout device 26 acquires the advertisement contents and the advertisement attribute information from the advertisement database 9 in order to select appropriate advertisements with respect to the Web page viewing display generated by the Web page display device 24 and determine the appropriate display positions, compares the Web page attribute information with the advertisement attribute information, and obtains the advertisements appropriate for the displayed Web pages and their display positions by utilizing the layout information providing database 15. Note that the advertisement database 9 stores information regarding the advertisements as the advertisement information records.

Also, in the user terminal 21, the overlay information composition device 22 composes the overlay information display with the Web page viewing display composed with the advertisement objects as generated by the Web page display device 24 and the advertisement composition device 23. In the case of displaying the advertisements as a part of the overlay information, the composition of the advertisements is also carried out at this stage.

In this case, the overlay information layout device 25 acquires the overlay information from the overlay information database 8 in order to select the overlay information appropriate for the Web page viewing display generated by the Web page display device 24 and determine the display positions and the display contents, and obtains the display positions by utilizing the layout information providing database 15. In this way, the user can view the advertisements and the overlay information that are arranged at appropriate display positions along with a large amount of the Web pages at the user terminal 21.

Figure 5:
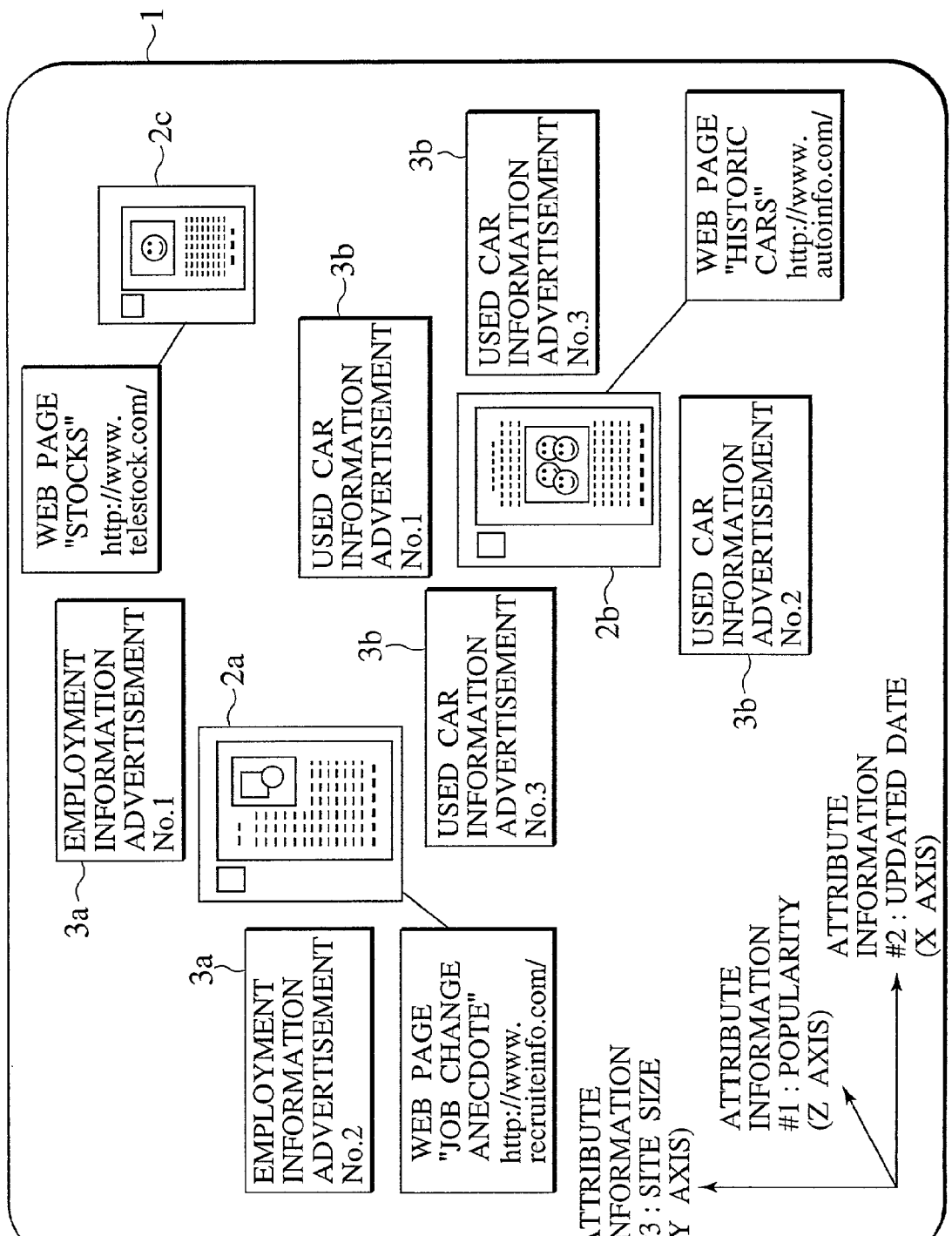
FIG. 5 is a diagram showing another exemplary display screen in which the multiple Web pages and advertisements are displayed according to coordinate axes representing attribute information in the advertisement posting system of FIG. 2.

FIG. 5 shows one exemplary display screen 1 of the comprehensive information viewing device constituting the user terminal 21, in which a plurality of Web pages 2a, 2b and 2c are displayed, by setting the Web page attribute information of "updated date","site size" and "popularity" as X, Y and Z axes respectively as indicated on a lower left corner, and a plurality of advertisements 3a and 3b are displayed in vicinities of respectively related Web pages.

In order to realize such a display, the Web page layout device 27 of the user terminal 21 acquires the attribute information of the Web pages 2a, 2b and 2c from the Web page attribute information database 10. Then, the Web page layout device 27 determines the layout positions in the display space according to the acquired attribute information, by utilizing the layout information providing database 15.

The comprehensive information viewing device searches for advertisements which have the attribute close to the attribute information of the displayed Web page from the records of the advertisement database 9 as shown in FIG. 7, and selects advertisements to be displayed on the display screen 1. Each record of the advertisement database 9 shown in FIG. 7 records contents, attribute information, overlay information provider, advertisement data, etc.

FIG. 8 shows exemplary records of the Web page attribute information database 10, where each record records URL, attribute information #1: classification, attribute information #2: updated date, attribute information #3: site size, attribute information #4: popularity, attribute information #5: sponsor, Web page information provider information, etc. Here, the attribute information #1: classification includes categories such as card, stocks, job change anecdote, PC information, etc.

In the case where the Web page attribute information is the "job change anecdote" shown in FIG. 8, for example, the advertisements close to this attribute information "job change anecdote" include those of the "real time employment information service" among the records of the advertisement database 9 shown in FIG. 7, so that the advertisement layout device 26 takes out the advertisement data of the "real time employment information service" from the advertisement database 9, and determines the display positions of these advertisements by utilizing the layout information providing database 15. Then, the advertisement composition device 23 carries out the display composition using the determined advertisement display positions, and displays employment information advertisements (No. 1, No. 2, and No. 3) 3a around the Web page "job change anecdote" 2a as shown in FIG. 5. In other words, the layout information providing database 15 specifies the layout in which the display positions of the advertisements are arranged in a vicinity of the Web page that has the related attribute information.

Also, similarly, in the case where the Web page attribute information is the "historic cars" shown in FIG. 8, for example, the advertisements of the "used car auction" shown in FIG. 7 are displayed as "used car information advertisements" (No. 1, No. 2 and No. 3) 3b around the Web page "historic cars" 2b as shown in FIG. 5.

Figure 6:
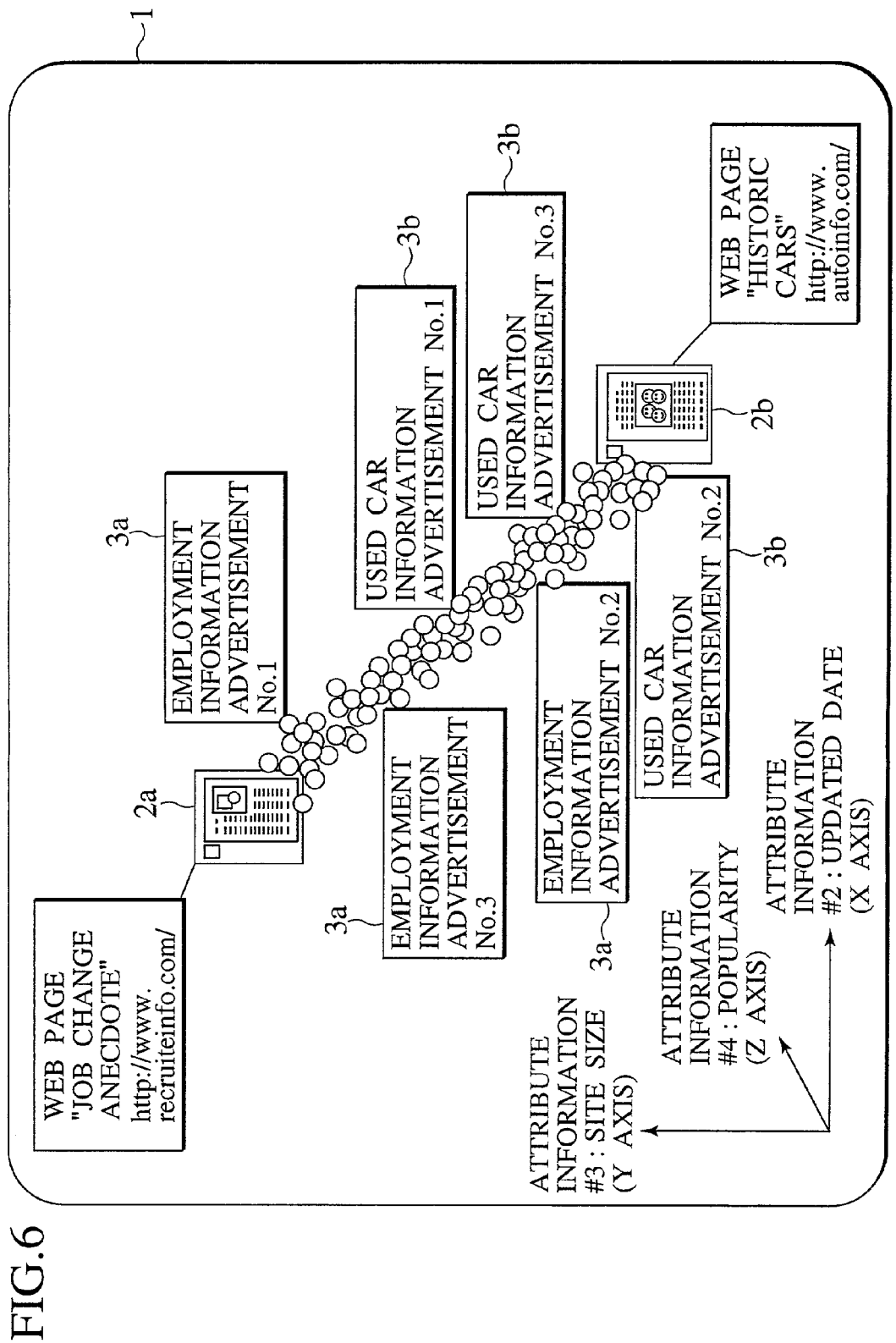
FIG. 6 is a diagram showing another exemplary display screen in which the multiple Web pages, advertisements, and overlay information are displayed according to coordinate axes representing attribute information in the advertisement posting system of FIG. 2.

FIG. 6 shows another exemplary display screen 1 of the comprehensive information viewing device constituting the user terminal 21, in which a plurality of Web pages 2a and 2b are displayed, by setting the Web page attribute information of "updated date", "site size" and "popularity" as X, Y and Z axes respectively and a plurality of advertisements 3a and 3b are displayed in vicinities of respectively related Web pages, similarly as in FIG. 5, and in addition, the user traffic information as an example of the overlay information 4 is also displayed in superposition.

Here, the user traffic information indicates the number of users who made transitions between the Web pages by tracing hyperlinks between the Web pages as indicated in a part (b) of FIG. 9. In the example shown in a part (b) of FIG. 9, the first line indicates that there are ten users who made transitions from URL0 to URL1, and these ten users have the attributes as described there. Each user attribute can be described in a list format in the record, and the record contains a pointer for indicating the location of the attribute, for example.

The overlay information layout device 25 acquires the overlay information for the Web pages 2a and 2b from the overlay information database 8 so as to obtain the user traffic information as shown in a part (b) of FIG. 9, and displays the user traffic information at the user terminal 21 as the overlay information in forms of particles (one particle representing one user) in animation. In FIG. 6, the transition states of the users can be intuitively conveyed to the user watching the display screen 1 as the particles in animation move from the Web page 2a to the Web page 2b smoothly. Note that a part (a) of FIG. 9 shows exemplary records of the overlay information database 8.

The comprehensive information viewing device searches for advertisements which have the attribute close to the attribute information of the displayed Web page from the records of the advertisement database 9 as shown in FIG. 7, and selects advertisements to be displayed on the display screen 1.

In the case where the Web page attribute information is the "job change anecdote" shown in FIG. 8, for example, the advertisements close to this attribute information "job change anecdote" include those of the "real time employment information service" among the records of the advertisement database 9 shown in FIG. 7, so that the advertisement layout device 26 takes out the advertisement data of the "real time employment information service" from the advertisement database 9, and determines the display positions of these advertisements by utilizing the layout information providing database 15. Then, the advertisement composition device 23 carries out the display composition using the determined advertisement display positions, and displays employment information advertisements (No. 1, No. 2, and No. 3) 3a around the Web page "job change anecdote" 2a as shown in FIG. 5. In other words, the layout information providing database 15 specifies the layout in which the display positions of the advertisements are arranged in a vicinity of the Web page that has the related attribute information.

In FIG. 6, the advertisement information can be displayed in animation similarly as the particles of the overlay information such that the advertisement information corresponding to the transition states of the users can be conveyed to the user watching the display screen 1. Also, similarly, the advertisements of the "used car auction" are displayed in a vicinity of the overlay information 4.

Namely, in FIG. 6, each particle of the overlay information represents each user who made a transition between the Web pages, and the advertisement appropriate for the attribute of each user is displayed in a vicinity of a particle representing each user, such that the advertisement having the attribute close to the user attribute information contained in the overlay information is displayed in a vicinity of that overlay information.

Figure 10:
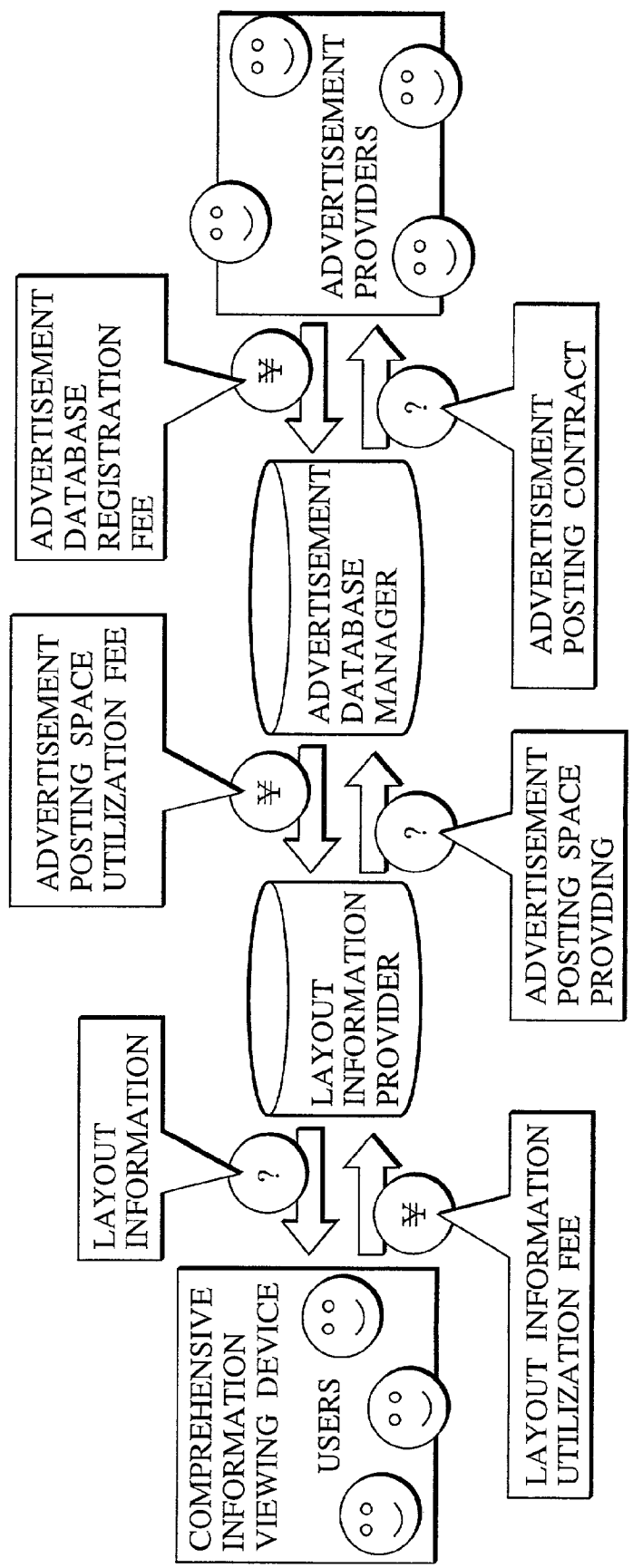
FIG. 10 is a schematic diagram showing relationships among users, a layout information provider, an advertisement database manager and advertisement providers in a business model using the advertisement posting system of FIG. 2.

FIG. 10 shows a relationship among users, a layout information provider, an advertisement database manager, and advertisement providers in a business model utilizing the comprehensive information viewing device of the advertisement posting system according to this embodiment.

As shown in FIG. 10, the user of the comprehensive information viewing device obtains the layout information from the layout information provider in exchange to the payment of the layout information utilization fee to the layout information provider, and the layout information provider receives the advertisement posting space utilization fee from the advertisement database manager in return to providing the advertisement posting space to the advertisement database manager, and the advertisement database manager receives the advertisement database registration fee from the advertisement provider upon making an advertisement posting contract with the advertisement provider.

From a viewpoint of the advertisement provider, the advertisements with close attributes will be posted in a display space interested by the user so that the high advertisement posting effect can be expected, and it is possible to increase the likelihood of having the advertisements recognized by the users compared with the conventional banner advertisement, by posting the advertisements within a display region of the comprehensive information viewing device.

From a viewpoint of the advertisement database manager who corresponds to the conventional advertisement agent, it is possible to increase the advertisement handling revenue because it is possible to increase the likelihood of having the advertisements recognized by the users compared with the conventional banner advertisement, by posting the advertisements within a display region of the comprehensive information viewing device. Moreover, it is also possible to provide various applied services because the advertisement database manager manages the advertisement attribute information.

From a viewpoint of the layout information provider, it is possible to increase the advertisement handling revenue because it is possible to increase the likelihood of having the advertisements recognized by the users compared with the conventional banner advertisement, by posting the advertisements within a display region of the comprehensive information viewing device. Moreover, it is also possible collect marketing data by collecting information on users of the comprehensive information viewing device. Furthermore, it is possible to realize a new service on the Internet by charging the layout information utilization fee to the users of the comprehensive information viewing device. Here, the users of the comprehensive information viewing device may expect a discount of the layout information utilization fee under the condition of accepting the posting of the advertisements.

As described, according to the first embodiment, it is possible to realize an advertisement posting scheme capable of posting advertisements effectively, without hampering the Web page readability, by utilizing the comprehensive information viewing scheme capable of displaying multiple Web pages simultaneously at arbitrary positions, angles, sizes and transparency levels in a three-dimensional space by handing the Web pages as three-dimensional objects, for the purpose of the advertisement posting such that multiple advertisements can be displayed at arbitrary positions, angles, sizes and transparency levels in the three-dimensional space.

Figure 11:
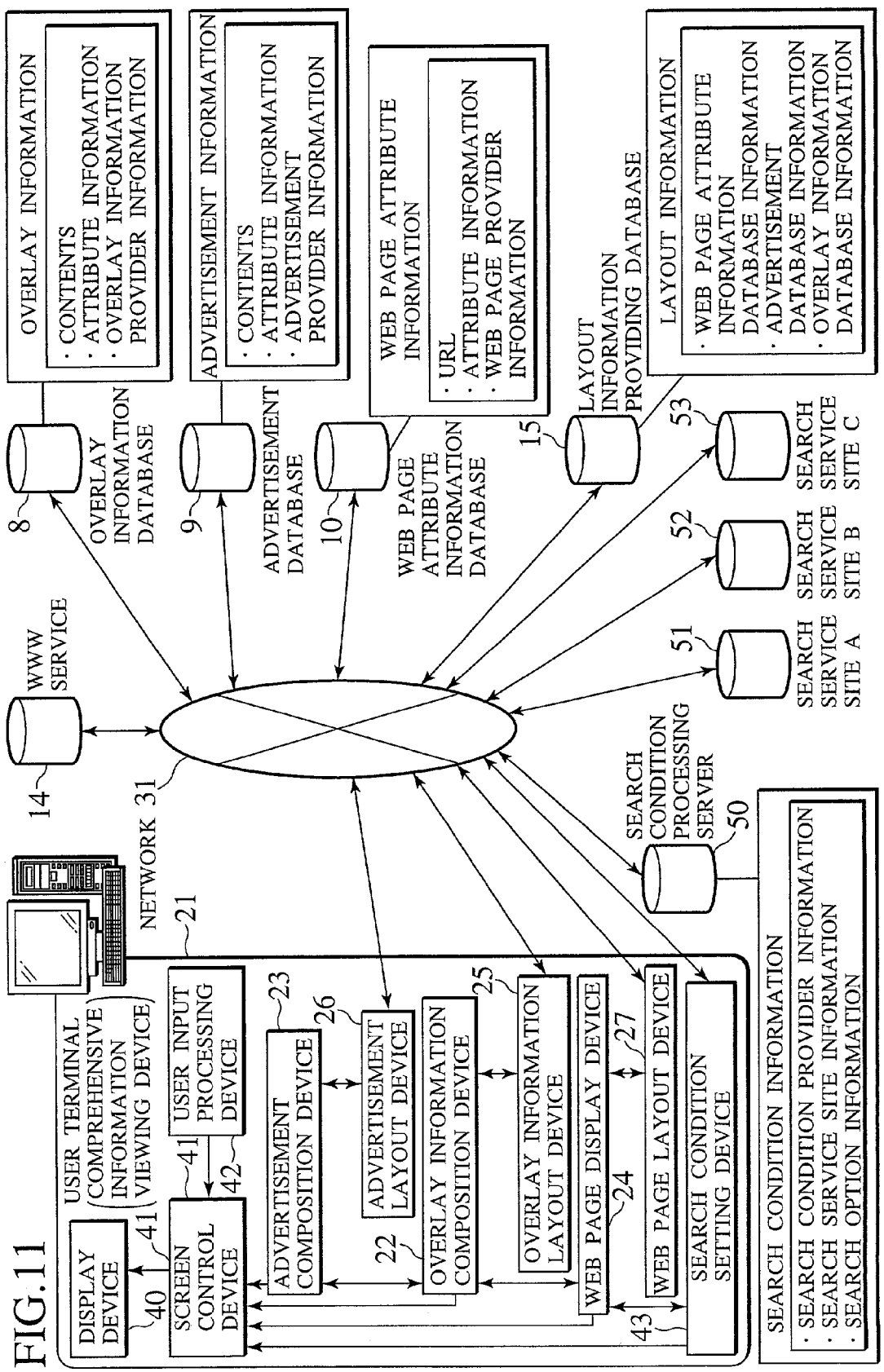
FIG. 11 is a block diagram showing an exemplary configuration of an advertisement posting system according to the second embodiment of the present invention.
Figure 12:
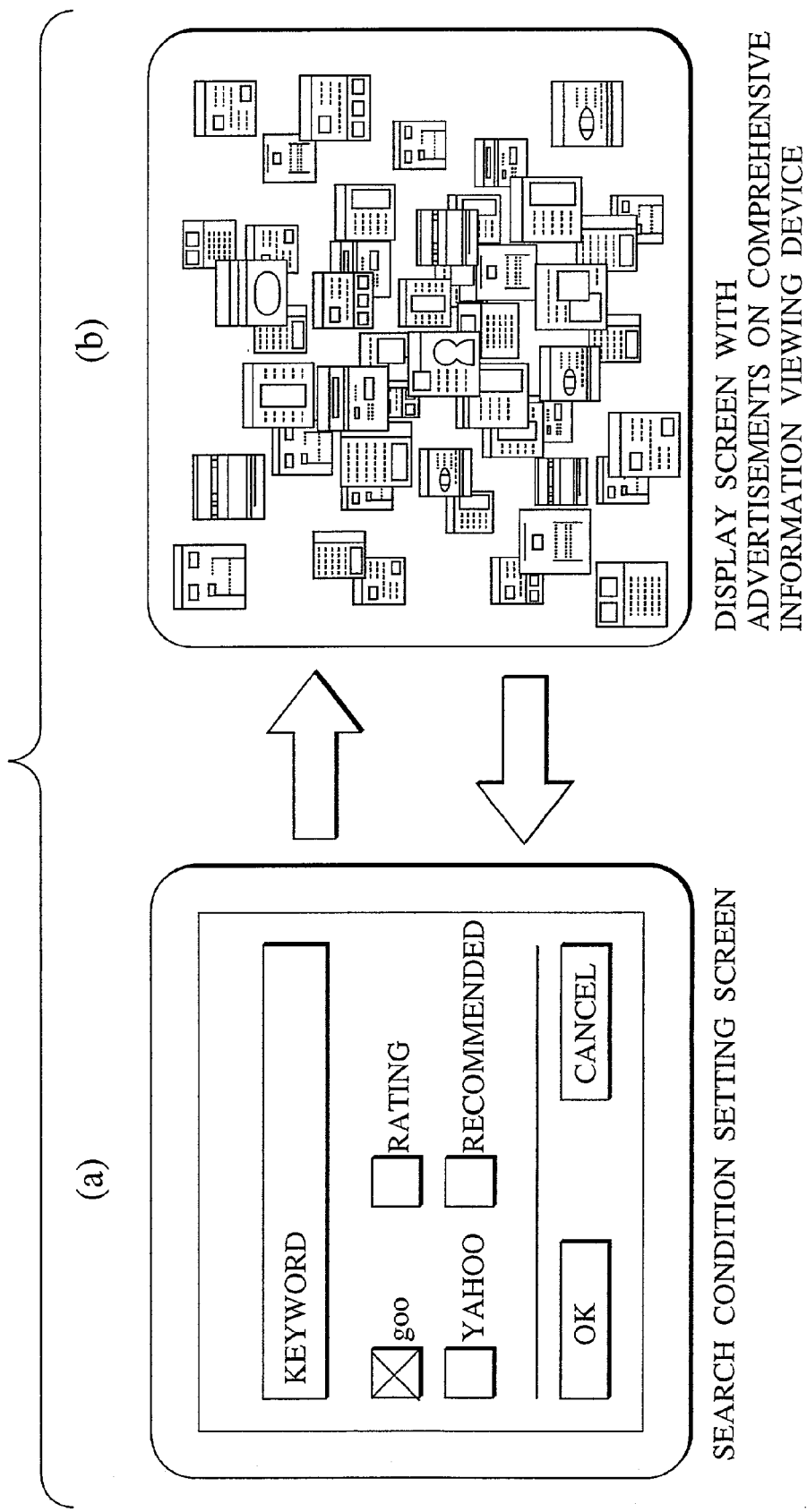
FIG. 12 is a diagram showing an exemplary search condition setting screen and an exemplary display screen in the advertisement posting system of FIG. 11.

Referring now to FIG. 11 and FIG. 12, the second embodiment of an advertisement posting scheme according to the present invention will be described in detail.

FIG. 11 shows an exemplary configuration of an advertisement posting system according to the second embodiment, for realizing a Web page search and display service with the advertisement display function. In FIG. 11, those elements which are similar to the corresponding elements in the first embodiment of FIG. 2 are given the same reference numerals.

In the advertisement positing system of FIG. 11, the user terminal (comprehensive information viewing device) 21 further includes a display device 40, a screen control device 41, a user input processing device 42, and a search condition setting device 43. The advertisement posting system of FIG. 11 further includes a search condition processing server 50, and search service sites (A, B and C) 51, 52 and 53 which are connected to the network 31.

The screen control device 41 is a device capable of executing the 3D graphics API (Application Program Interface) such as OpenGL or DirectX.

The user input processing device 42 carries out processing of an input information from an input device such as keyboard, mouse or joy stick connected to the comprehensive information viewing device, so as to carry out operations with respect to the comprehensive information viewing device and make viewpoint change requests to the screen control device 41.

The Web page display device 24 carries out the image formation of the Web page described by HTML or the like, for example, so as to generate texture data utilizable by the 3D graphics API. Also, the Web page display device 24 can display the Web pages that are arranged in a three-dimensional space on the display device 40 by sending a 3D object drawing request to the screen control device 41.

The advertisement composition device 23 carries out the image formation of the advertisement data described by HTML or the like, for example, so as to generate texture data utilizable by the 3D graphics API. Also the advertisement composition device 23 can display the advertisements that are arranged in a three-dimensional space on the display device 40 by sending a 3D object drawing request to the screen control device 41.

The overlay information composition device 22 carries out the image formation of the overlay data described by HTML or the like, for example, so as to generate texture data utilizable by the 3D graphics API. Also the overlay information composition device 22 can display the overlay information that is arranged in a three-dimensional space on the display device 40 by sending a 3D object drawing request to the screen control device 41.

The search condition setting device 43 downloads a search condition information from the search condition processing server 50 on the network 31 such as Internet or LAN, and displays the search condition information on the display device 40.

The user can carry out the setting of the search condition by utilizing the input device such as mouse or keyboard connected to the comprehensive information viewing device. Information on search keywords or search options entered by the user is sent to the search condition processing server 50.

The search condition processing server 50 accesses the search service site A 51, the search service site B 52, or the search service site C 53 on the network 31 by referring to the search service site information described in the search condition information, executes the search and obtains a search result such as Web page URL list. The search service site to be used can be selected by the user by using the search option.

The search condition setting device 43 acquires the search result from the search condition processing server 50 and stores the acquired search result.

Then, the search result is displayed along with the advertisement by the comprehensive information viewing device as follows.

The Web page display device 24 obtains the Web page URL list from the search condition setting device 43. The Web page, layout device 27 accesses to the Web page attribute information database 10 and determines the layout positions in the three-dimensional space of the Web pages according to their attribute information.

The Web page display device 24 carries out the image formation of the Web pages, and sends the 3D object drawing request for the Web page along with their layout positions to the screen control device 41, such that the Web pages are displayed on the display device 40. By executing this operation with respect to all the Web pages contained in the Web page URL list, the Web page display space reflecting the search result can be constructed.

The overlay information composition device 22 obtains the Web page URL list from the search condition setting device 43. The overlay information layout device 25 accesses the overlay information database 8, acquires the attribute information such as the "user traffic information", for example, by using the Web page URL as a key, and calculates the display position of the overlay information from the display position of the Web page.

The overlay information composition device 22 acquires the 3D object shape information corresponding to the overlay data from the overlay information database 8, and sends the drawing request to the screen control device 41 so as to display the overlay information on the display device 40. By executing this operation with respect to all the Web pages contained in the Web page URL list, the overlay information display related to the Web page display space can be constructed.

The advertisement composition device 23 acquires the Web page URL list from the Web page display device 24 and the overlay information from the overlay information composition device 22. The advertisement layout device 26 acquires the advertisement information related to the Web page URL list and the overlay information from the advertisement database 9, and calculates the display positions of the advertisements in the three-dimensional space according to the Web page layout information and the overlay information layout information.

The advertisement composition device 23 carries out the image formation of the advertisement contents, acquires the 3D object shape information corresponding to the advertisements, and sends the drawing request to the screen control device 41 so as to display the advertisements on the display device 40. By executing this operation with respect to all the Web pages contained in the Web page URL list and the overlay information, the advertisements related to the Web pages and the overlay information can be posted at appropriate positions.

In this way, the user can view the advertisements and the overlay information that are arranged at appropriate display positions along with a large amount of the Web pages at the user terminal 21.

For example, the search condition setting device 43 displays the search condition setting screen as shown in a part (a) of FIG. 12 on the display device 40. On this search condition setting screen, the user can enter the search condition by entering arbitrary keyword and selecting a desired search option. When the user clicks the "OK" button, the Web pages to be displayed are extracted according to the search condition set by the user and the advertisements appropriate for the attribute information of the Web pages are selected.

The comprehensive information viewing device then displays the Web pages and the advertisements in a form of a display screen as shown in a part (b) of FIG. 12. On this display screen, the user can view the Web pages and the advertisements interactively. Then, the user can carry out the setting of a new search condition if desired.

As described, according to the second embodiment, it is possible to realize a Web page search and display service with the advertisement posting function, which is capable of posting advertisements effectively, without hampering the Web page readability, by utilizing the comprehensive information viewing scheme capable of displaying multiple Web pages simultaneously at arbitrary positions, angles, sizes and transparency levels in a three-dimensional space by handing the Web pages as three-dimensional objects, for the purpose of the advertisement posting such that multiple advertisements can be displayed at arbitrary positions, angles, sizes and transparency levels in the three-dimensional space.

Referring now to FIG. 13 to FIG. 19, the third embodiment of the present invention will be described in detail.

This third embodiment is directed to a Web page image formation scheme which can be suitably adapted to the advertisement posting scheme of the present invention described above.

Figure 13:
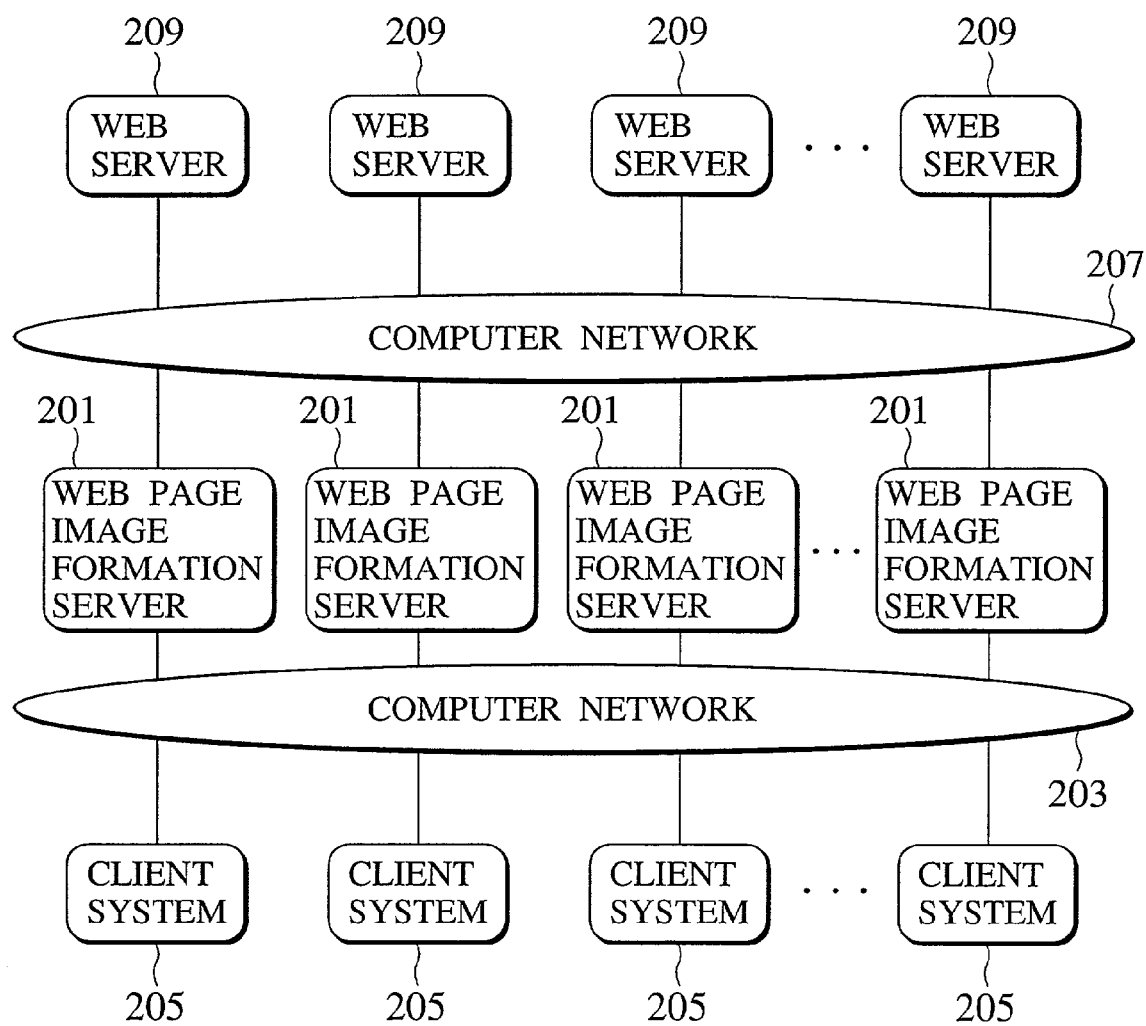
FIG. 13 is a block diagram showing an exemplary configuration of a Web page image formation system according to the third embodiment of the present invention.
Figure 14:
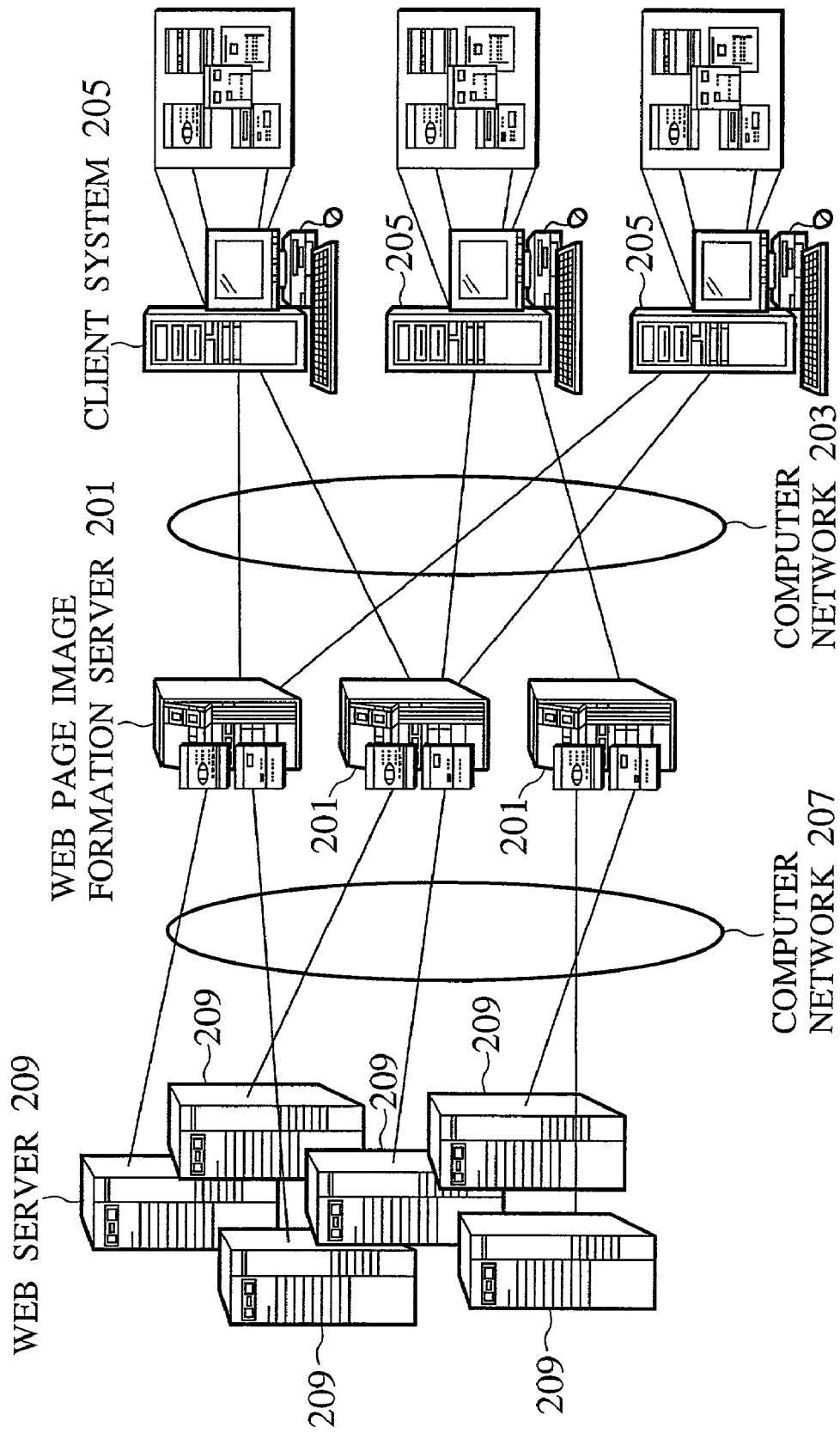
FIG. 14 is a schematic diagram showing an exemplary configuration of a Web page image formation system according to the third embodiment of the present invention.

FIG. 13 and FIG. 14 show an overall configuration of a Web page image formation system containing a Web page image formation server 201 which is a Web page image formation device for realizing a Web page image formation scheme of this embodiment, in forms of a block diagram and a schematic diagram respectively.

As shown in FIG. 13 and FIG. 14, a plurality of Web page image formation servers 201 are connected with a plurality of client systems 205 through a computer network 203 and with a plurality of Web servers 209 through a computer network 207, where the client systems 205 require the images of a plurality of Web pages, and upon receiving Web page image requests from the client systems 205, the Web page image formation servers 201 acquire the relevant Web pages from the Web servers 209 according to the requests, carries out the image formation of the acquired Web pages and returns the formed images of the Web pages to the client systems 205.

Note that, in FIG. 13 and FIG. 14, the computer network 203 and the computer network 207 are conceptually different networks but can be realized by the same network in practice.

Figure 1:
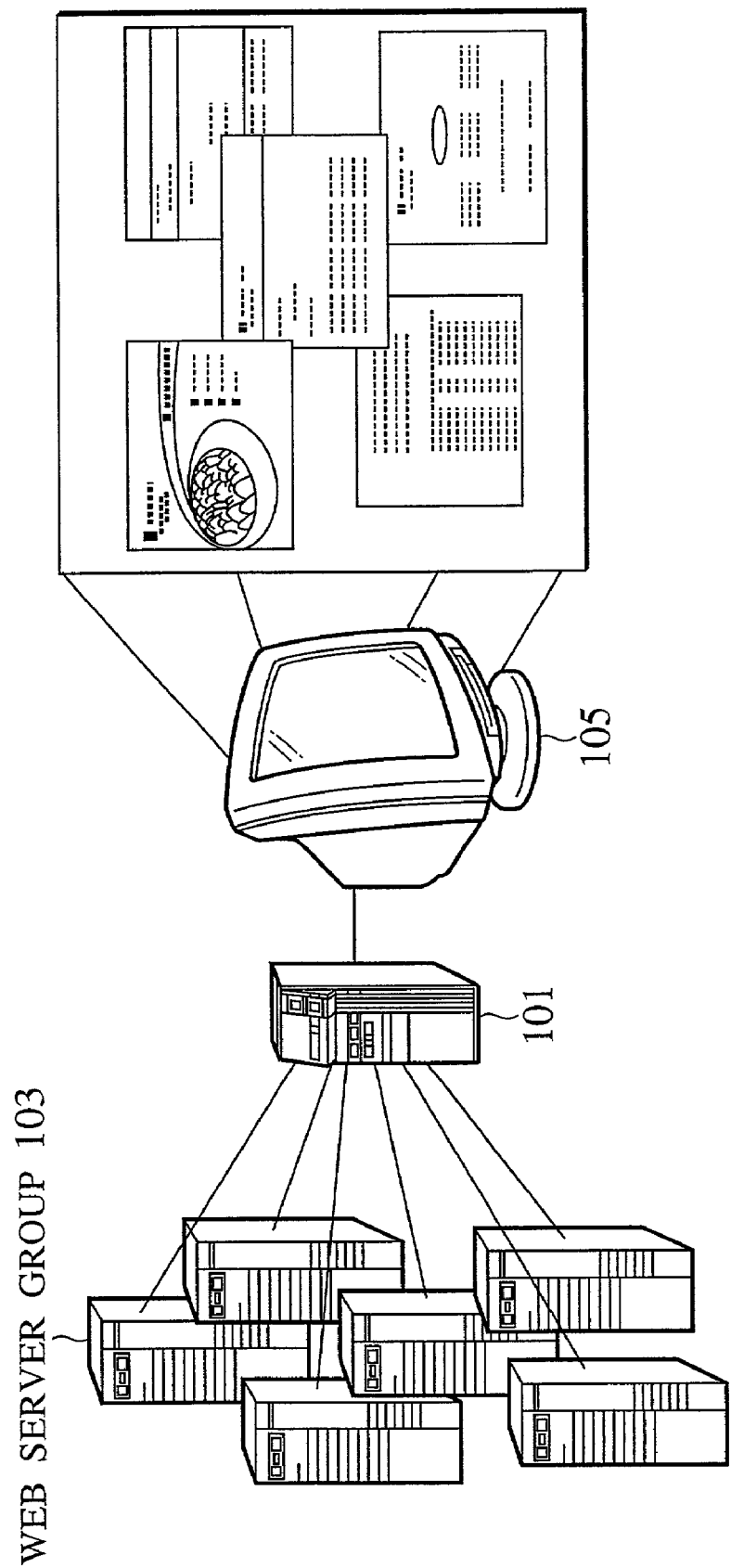
FIG. 1 is a schematic diagram showing a conventional Web page image formation system.

Here, in contrast to the conventional Web page image formation system of FIG. 1 described above, the Web page image formation system of this embodiment has features that the load balancing among the Web page image formation servers 207 is realized by separating a function regarding the Web page acquisition and a function regarding the image formation processing while these functions are shared among a plurality of client systems 205, and that the existing Web browser is used as the image formation processing engine such that the Web page image formation server 207 can be adapted to the latest WWW specifications by simply replacing the Web browser with the latest one.

Figure 15:
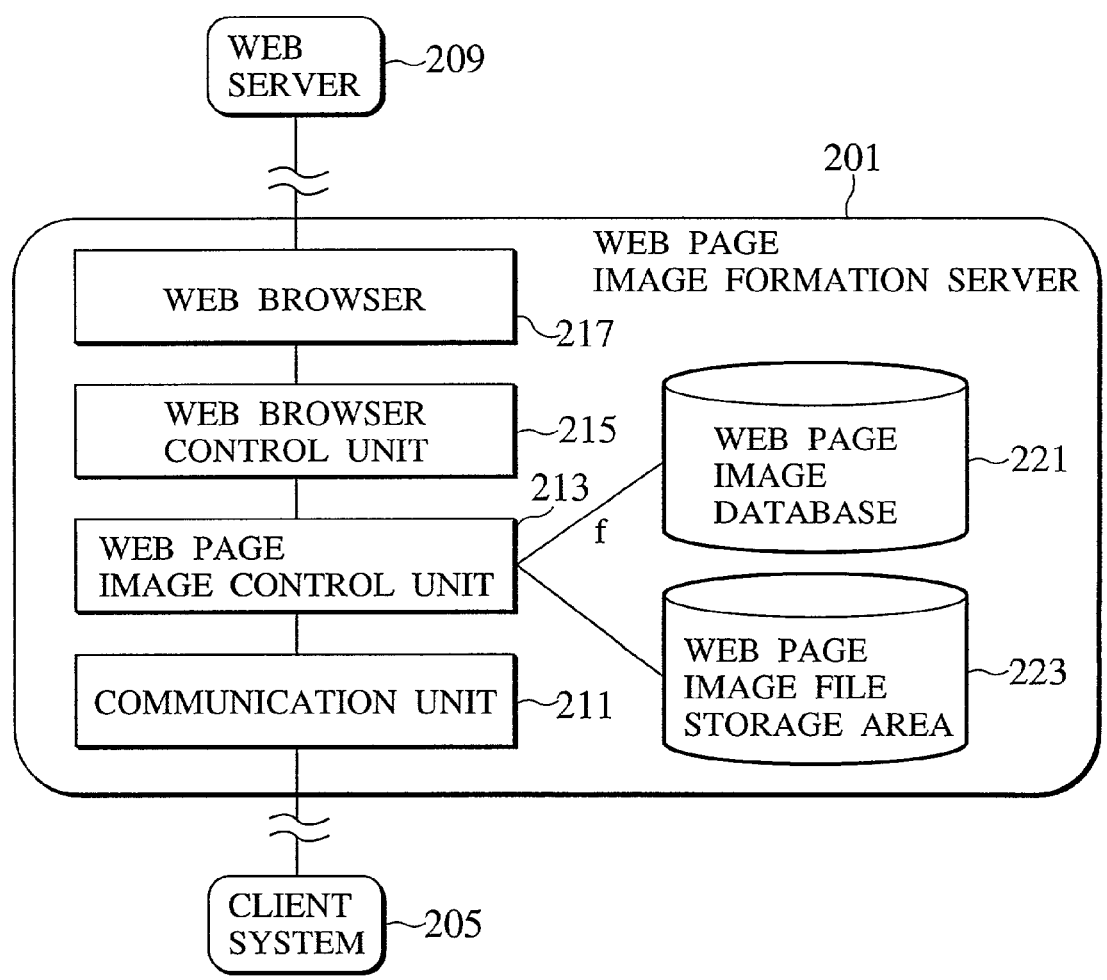
FIG. 15 is a block diagram showing an exemplary internal configuration of a Web page image formation server in the Web page image formation system of FIGS. 13 and 14.
Figure 16:
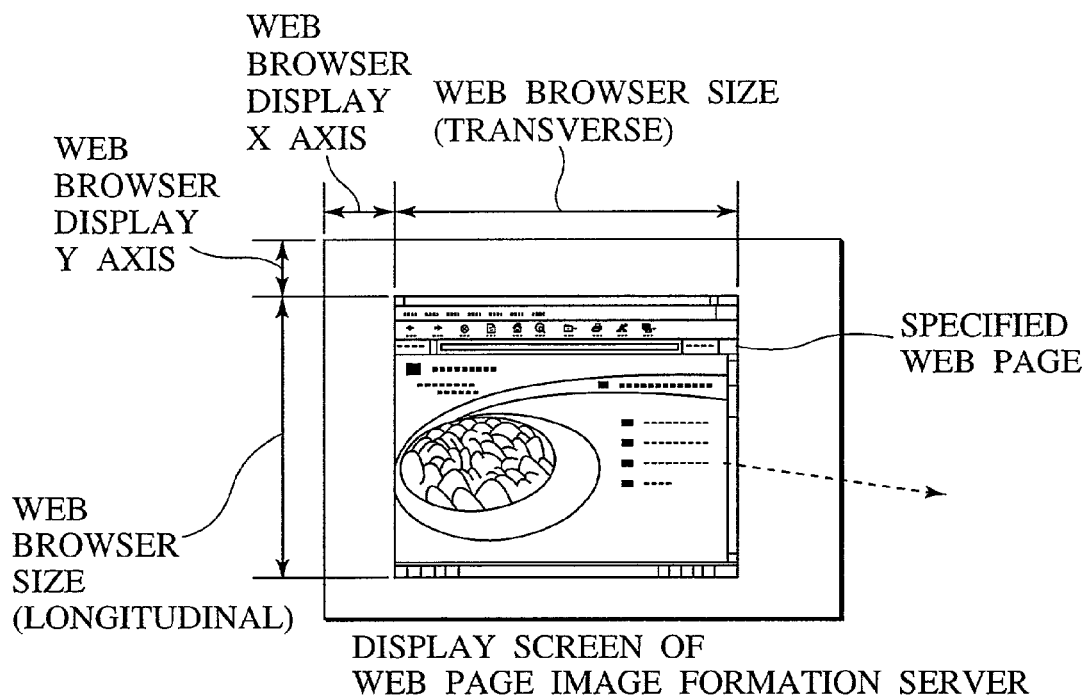
FIG. 16 is a diagram showing an exemplary display screen of a Web browser in the Web page image formation server of FIG. 15.
Figure 17:
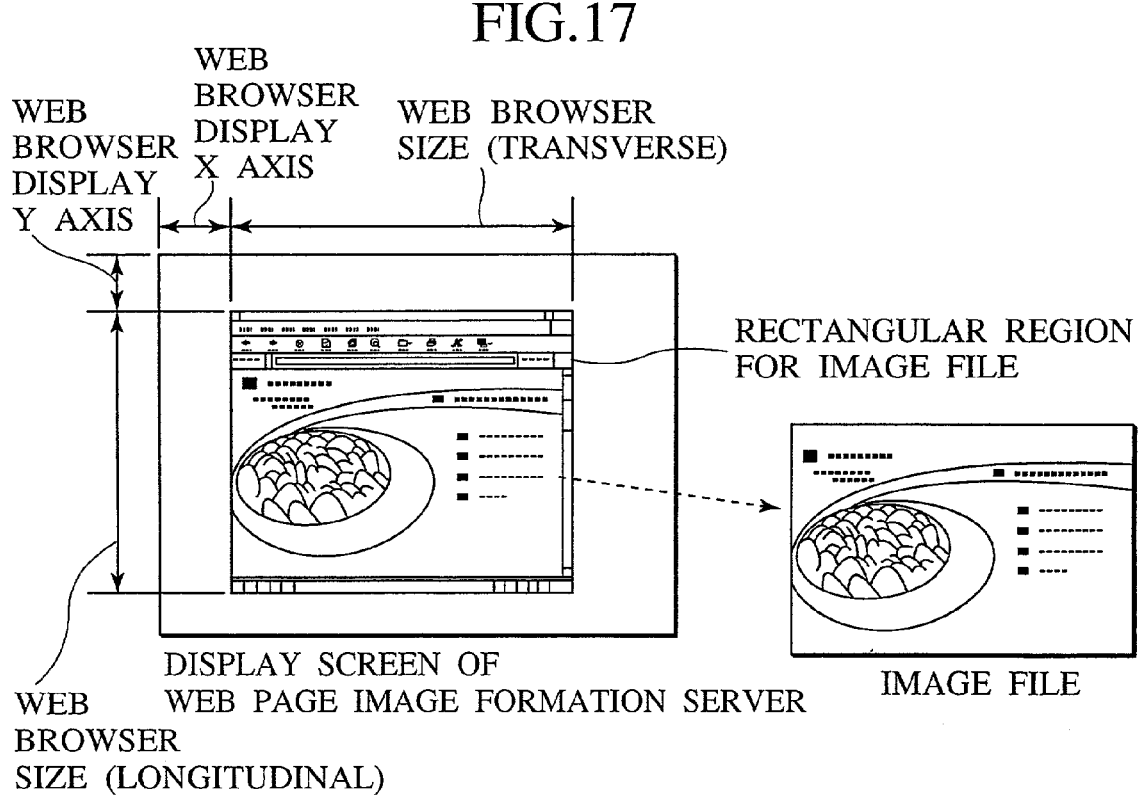
FIG. 17 is a diagram showing a rectangular region for image file that is calculated by a Web browser control unit in the Web page image formation server of FIG. 15.

FIG. 15 shows a detailed internal configuration of each Web page image formation server 201 in the system of FIG. 13 and FIG. 14.

As shown in FIG. 15, the Web page image formation server 201 comprises: a communication unit 211 connected with the client systems 205 through the computer network 203 (not shown in FIG. 15), for receiving Web page image requests from the client systems 205; a Web page image control unit 213 connected with the communication unit 211, for carrying out the Web page image acquisition control; a Web browser control unit 215 for receiving requests for the Web page image file acquisition and image formation from the Web page image control unit 213; a Web browser 217 of the existing type to be activated by the Web browser control unit 215, for acquiring HTML data of the Web pages from the Web servers 209 through the computer network 207 (not shown in FIG. 15) and displaying images of the Web pages; a Web page image database 221 connected with the Web page image control unit 213, for storing a path indicating the stored location of each Web page image file generated by the Web page image control unit 213, in correspondence to an address of the Web page in a form of a correspondence table; and a Web page image file storage area 223 formed by disks for storing the Web page image files.

The communication unit 211 receives the Web page image request from the client system 205 along with data related to the Web page image formation including a Web page address (URL), an image size (numbers of pixels in transverse and longitudinal directions), an image format (Bitmap, JPEG, etc.), font and size of the Web page title, etc., and returns a response code (success, failure, etc.) received from the Web page image control unit 213 in response to this Web page image request, as well as the Web page image file data in the case where the response code indicates success, to the client system 205.

The Web page image control unit 213 receives the data related to the Web page image formation including a Web page address (URL), an image size (numbers of pixels in transverse and longitudinal directions), an image format (Bitmap, JPEG, etc.), font and size of the Web page title, etc., from the communication unit 211, and judges whether the Web page image file specified by that data from the communication unit 211 is recorded in the Web page image database 221 or not.

When the specified Web page image file is recorded in the Web page image database 221, the Web page image control unit 213 acquires the path of that Web page image file from the Web page image database 221, reads out the image file corresponding to this path from the Web page image file storage area 223, and returns this image file along with the response code indicating success to the client system 205 through the communication unit 211. When the specified Web page image file is not recorded in the Web page image database 221, the We page image control unit 213 requests the acquisition and the image formation of the Web page corresponding to the specified Web page address to the Web browser control unit 215.

The Web browser control unit 215 manages a Web browser activation method and parameter setting according to the type of the Web browser 217. Upon receiving the Web page acquisition and image formation request from the Web page image control unit 213 along with data related to the Web browser control including a Web page address (URL), a Web browser size (numbers of pixels in transverse and longitudinal directions) and a Web browser display position (X and Y coordinates on the display screen) (see FIG. 16), the Web browser control unit 215 activates the Web browser 217 such that the Web browser 217 acquires the HTML data of the Web page from the Web server 209 and displays the image of the Web page.

In the case where the display of the Web browser control unit 215 is successful, the Web browser control unit 215 calculates a rectangular region for image file (see FIG. 17), and sends the response code indicating success and the rectangular region of the Web page to the Web page image control unit 213. The Web page image control unit 213 captures the rectangular region received from the Web browser control unit 215 (by utilizing the existing window system function), converts the image data into the image format (Bitmap, JPEG, etc.) specified from the communication unit 211, and stores the image data as the image file in the Web page image file storage area 223. The Web page image control unit 213 also records the Web page address, the image size, the image format, and the path of the image file into the Web page image database 221, and returns the image file to the communication unit 211.

Here, data to be transmitted and received between various elements are as follows.

From the client system 205 to the communication unit 211, all the data items related to the image formation including a Web page address (URL), an image size (numbers of pixels in transverse and longitudinal directions), an image format (Bitmap, JPEG, etc.), font and size of the Web page title, etc. are transmitted, whereas from the communication unit 211 to the client system 205, the response code (success, failure, etc.) and the image file are transmitted.

From the communication unit 211 to the Web page image control unit 213, all the data items required for the image formation including a Web page address (URL), an image size (numbers of pixels in transverse and longitudinal directions), an image format (Bitmap, JPEG, etc.), font and size of the Web page title, etc. are transmitted, whereas from the Web page image control unit 213 to the communication unit 211, the response code (success, failure, etc.). and the image file are transmitted.

From the Web page image control unit 213 to the Web browser control unit 215, all the data items related to the Web browser control including a Web page address (URL), a Web browser size (numbers of pixels in transverse and longitudinal directions) and a Web browser display position (X and Y coordinates on the display screen) are transmitted, whereas from the Web browser control unit 215 to the Web page image control unit 213, the response code (success, failure, etc.) and the Web page image rectangular region (a starting X coordinate value, a starting Y coordinate value, a transverse length, and a longitudinal length of the image) are transmitted.

From the Web browser control unit 215 to the Web browser 217, all the data items related to the activation of the Web browser including a Web page address (URL) and a Web browser size (numbers of pixels in transverse and longitudinal directions) are transmitted, whereas from the Web browser 217 to the Web browser control unit 215, the response code (success, failure, etc.) is transmitted.

From the Web browser 217 to the Web server 209, the Web page address (URL) is transmitted, whereas from the Web server 209 to the Web browser 217, the response code (success, failure, etc.) and the HTML data are transmitted.

From the Web page image control unit 213 to the Web page image database 221, a Web page address (URL), an image size (numbers of pixels in transverse and longitudinal directions), and an image format (Bitmap, JPEG, etc.) are transmitted, whereas from the Web page image database 221 to the Web page image control unit 213, the response code (presence or absence of the corresponding image file) and the path of the Web page image file are transmitted. Alternatively, from the Web page image control unit 213 to the Web page image database 221, a Web page address (URL), an image size (numbers of pixels in transverse and longitudinal directions), an image format (Bitmap, JPEG, etc.) and the path of the Web page image file are transmitted, whereas from the Web page image database 221 to the Web page image control unit 213, the response code (presence or absence of the corresponding image file) is transmitted.

Figure 18:
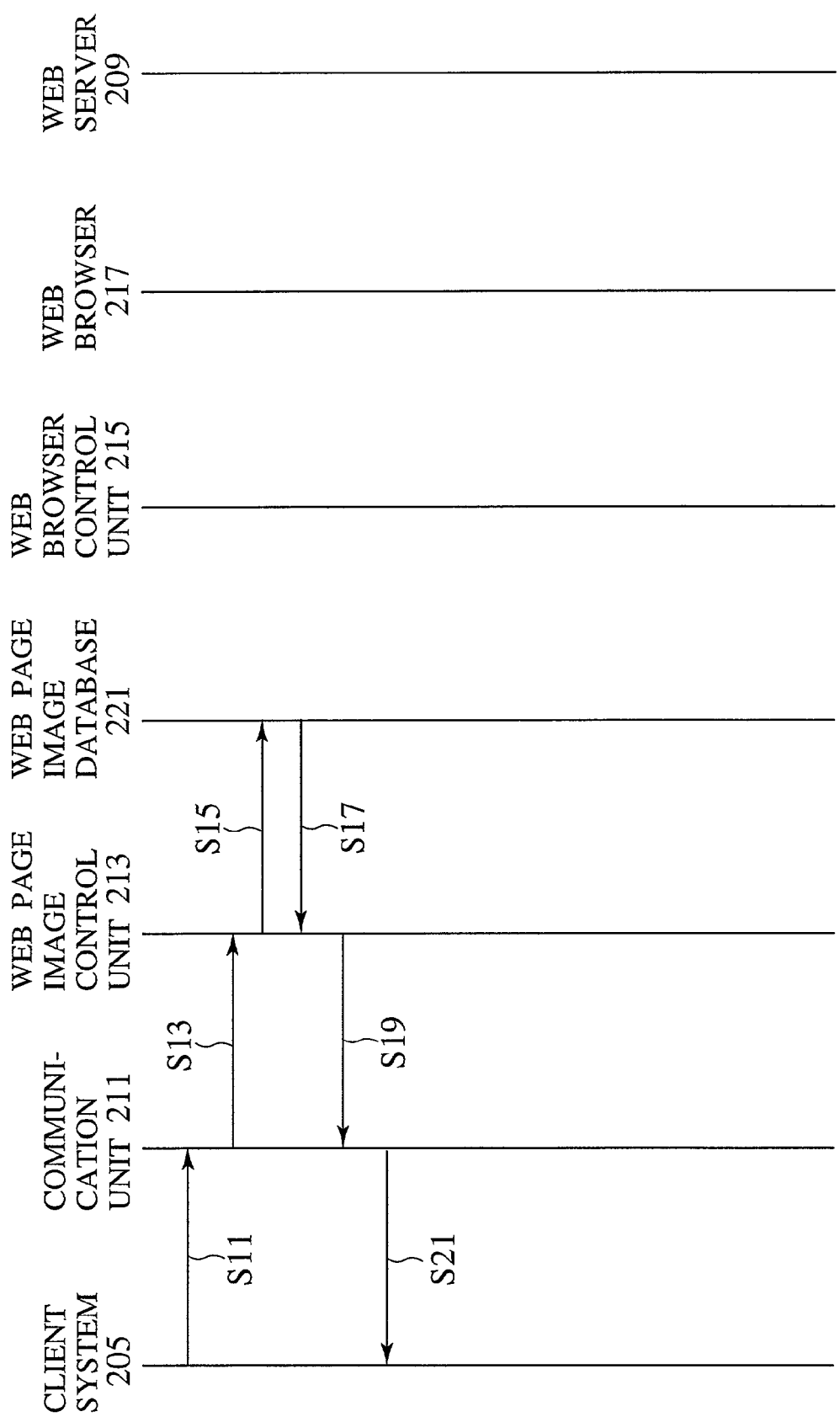
FIG. 18 is a sequence chart for the operations in the case of requesting Web page images already stored in a Web page image database in the Web page formation server of FIG. 15.
Figure 19:
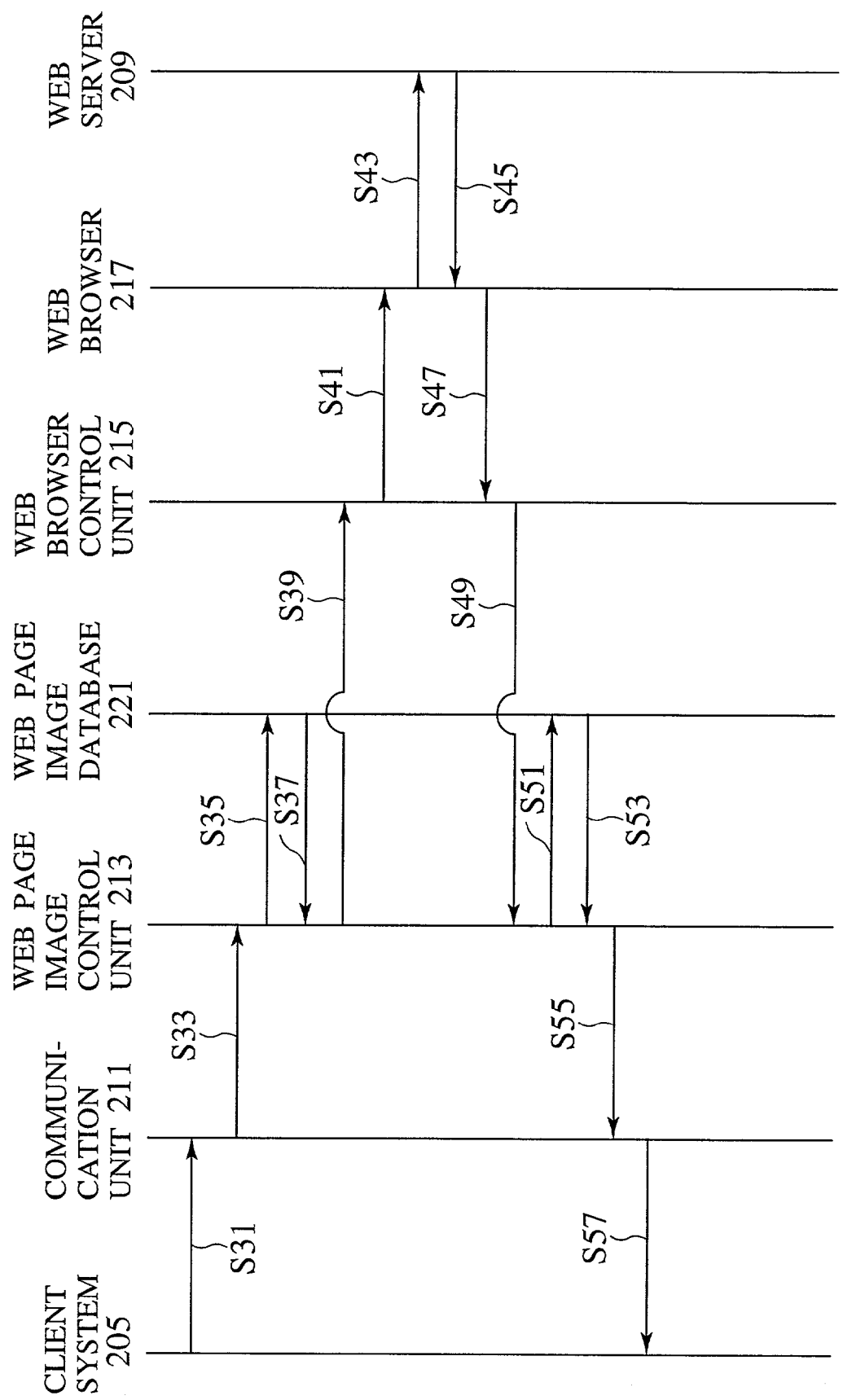
FIG. 19 is a sequence chart for the operations in the case of requesting Web page images not yet stored in a Web page image database in the Web page formation server of FIG. 15.

Next, with references to FIG. 18 and FIG. 19, the operations in the Web page image formation system as described above will be described.

First, with reference to FIG. 18, the operations in the case of the image formation request for the Web page that is already stored in the Web page image database 221 will be described.

The client system 205 first transmits the Web page image request to the communication unit 211 through the computer network 203, along with the data related to the image formation including a Web page address (URL), an image size (numbers of pixels in transverse and longitudinal directions), an image format (Bitmap, JPEG, etc.), font and size of the Web page title, etc. (step S11). The communication unit 211 transfers the received Web page image request and image formation related data to the Web page image control unit 213 (step S13).

The Web page image control unit 213 transmits the Web page address, the image size and the image format specified by the image formation related data received from the communication unit 211 to the Web page image database 221 and requests the corresponding Web page to the Web page image database 221 (step S15).

The Web page image database 221 checks whether the image file of the corresponding Web page is stored or not according to the request, and in the case where the image file of the corresponding Web page is stored, the Web page image database 221 returns the response code indicating that the image file of the corresponding Web page is stored and the path indicating the stored location of that image file to the Web page image control unit 213 (step S17).

In the case where the response code returned from the Web page image database 221 indicates that the image file of the corresponding Web page is stored, the Web page image control unit 213 reads out the image file at the path indicating the stored location as received from the Web page image database 221 from the Web page image file storage area 223, and returns the response code indicating success and data of the image file to the communication unit 211 (step S19).

Upon receiving the response code indicating success and the image file data from the Web page image control unit 213, the communication unit 211 returns the response code indicating the image formation success and the image file data to the client system 205 through the computer network 203 (step S21).

Next, with reference to FIG. 19, the operations in the case of the image formation request for the Web page that is not yet stored in the Web page image database 221 will be described.

The client system 205 first transmits the Web page image request to the communication unit 211 through the computer network 203, along with the data related to the image formation including a Web page address (URL), an image size (numbers of pixels in transverse and longitudinal directions), an image format (Bitmap, JPEG, etc.), font and size of the Web page title, etc. (step S31). The communication unit 211 transfers the received Web page image request and image formation related data to the Web page image control unit 213 (step S33).

The Web page image control unit 213 transmits the Web page address, the image size and the image format specified by the image formation related data received from the communication unit 211 to the Web page image database 221 and requests the corresponding Web page to the Web page image database 221 (step S35).

The Web page image database 221 checks whether the image file of the corresponding Web page is stored or not according to the request, and in the case where the image file of the corresponding Web page is not stored, the Web page image database 221 returns the response code indicating that the image file of the corresponding Web page is not stored to the Web page image control unit 213 (step S37).

In the case where the response code returned from the Web page image database 221 indicates that the image file of the corresponding Web page is not stored, the Web page image control unit 213 transmits the request for the Web page image file acquisition and image formation to the Web browser control unit 215 along with the data related to the Web browser control including a Web page address (URL), a Web browser size (numbers of pixels in transverse and longitudinal directions) and a Web browser display position (X and Y coordinates on the display screen) (step S39).

In response to the Web page image file acquisition and image formation request from the Web page image control unit 213, the Web browser control unit 215 activates the Web browser 217 according to the data related to the activation of the Web browser including a Web page address (URL) and a Web browser size (numbers of pixels in transverse and longitudinal directions) (step S41).

When activated by the Web browser control unit 215, the Web browser 217 accesses the Web server 209 according to the Web page address (URL) contained in the browser activation related data (step S43), and acquires the HTML data of the Web page specified by the Web page address (URL) from the Web server 209 and displays it on a display screen (step S45). Also, the Web browser 217 returns the response code indicating the successful acquisition of the corresponding Web page to the Web browser control unit 215 (step S47).

Upon receiving the response code indicating the successful acquisition of the corresponding Web page from the Web browser 217, the Web browser control unit 215 calculates the Web page image rectangular region (a starting X coordinate value, a starting Y coordinate value, a transverse length, and a longitudinal length of the image), and returns the response code indicating success and the rectangular region to the Web page image control unit 213 (step S49).

Upon receiving the response code indicating success from the Web browser control unit 215, the Web page image control unit 213 captures the rectangular region (by utilizing the existing window system function), converts the image data into the image format (Bitmap, JPEG, etc.) specified from the communication unit 211, and stores the image data as the image file in the Web page image file storage area 223, while also recording the Web page address, the image size, the image format, and the path of the image file into the Web page image database 221 (step S51). When this recording is successfully completed, the Web page image database 211 returns the response code indicating the registration success to the Web page image control unit 213 (step 53).

Upon receiving the response code indicating the registration success from the Web page image database 221, the Web page image control unit 213 transmits the response code indicating the image formation success along with the Web page image file data to the communication unit 211 (step S55). The communication unit 211 then returns the response code indicating the image formation success and the Web page image file data received from the Web page image control unit 213 to the client system 205 through the computer network 203 (step S57).

Note that, in the third embodiment described above, a protocol such as HTTP, for example, can be used for communications between the client system 205 and the Web page image formation server 201. Also, the communication unit 211 itself can be implemented by the existing WWW server, and the Web page image control unit 213 can be realized by the CGI (Common Gateway Interface) or Servlet techniques.

In the case of using HTTP for communications between the client system 205 and the communication unit 211, the message from the client system 205 can be given in the following form, for example.

GET/
  RenderingMessenger.dll?command=get_image_combined&
  create_size_y=512&
  create_size_x=512&contenttype=image&
  url=http%3A%2F%2Fwww.ntt.co.jp%2F& image_file_format=jpeg&image_quality_factor=2HTTP/1.0

In this example, the web page address to be the image formation target is specified as "http://www.ntt.co.jp" (which is encoded in the URL format in this example), the size is specified as 512×512 pixels, the format is specified as JPEG.

Also, the message from the communication unit 211 to the client system 205 can be given in the following form, for example.

HTTP1.0 200 OK
Content Length: 1654
(the number of bytes of the image file data=1654 bytes)
Content-Type: image/jpeg
(the format of the image file=JPEG)
Image file data content As described, according to the Web page image formation system of the third embodiment, it is possible to distribute the works regarding the Web page acquisition and image formation so that the system load can be reduced, and the works regarding the Web page acquisition and image formation can be shared among a plurality of client systems so that the system can be made more economical. Also, the Web page image formation processing can be executed by using the ordinary Web browser so that a portion dependent on the latest specifications of HTML, style sheet, etc., can be handled by replacing the Web browser to the latest one.

Figure 20:
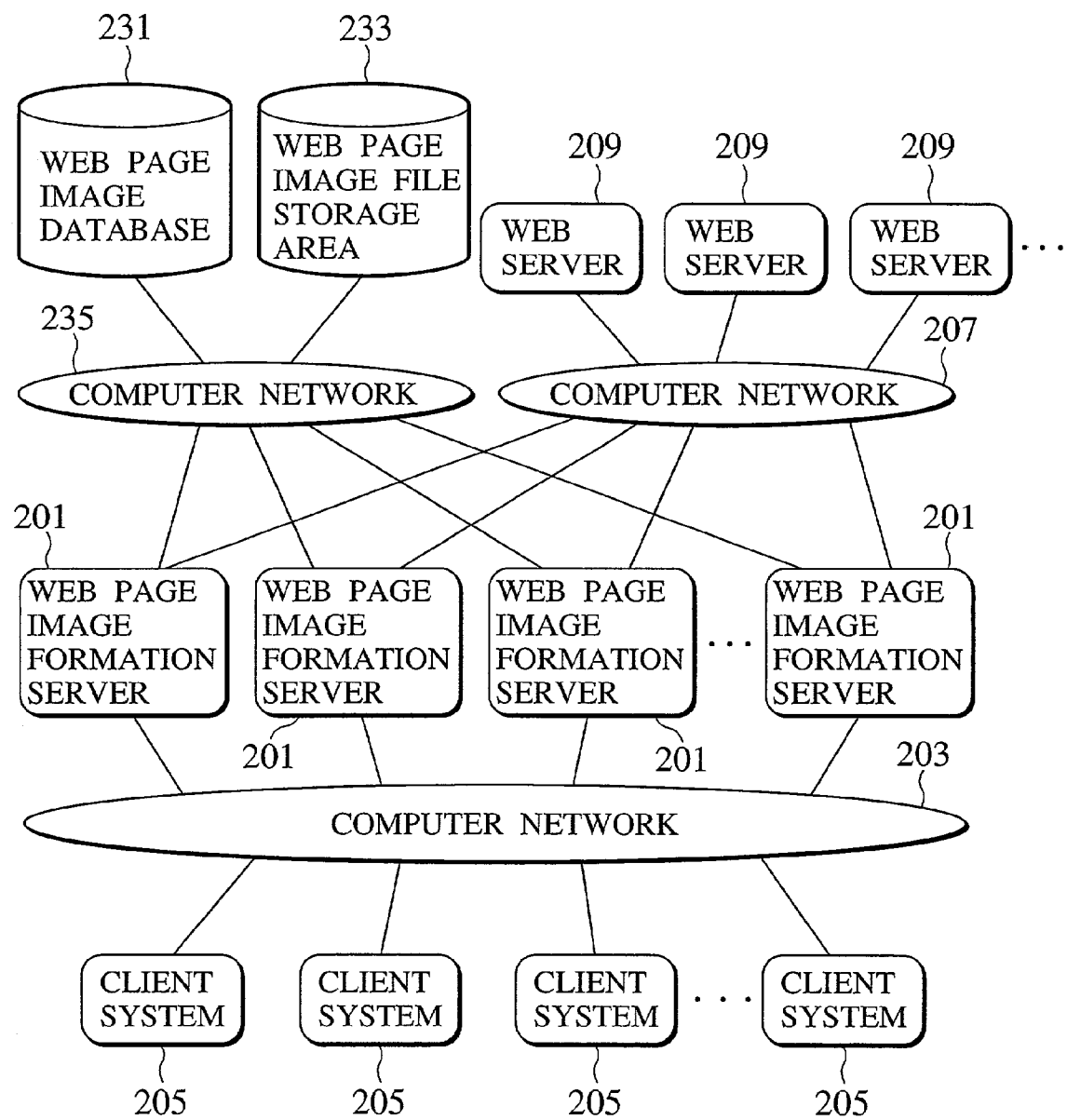
FIG. 20 is a block diagram showing an exemplary configuration of a Web page image formation system according to the fourth embodiment of the present invention.

Referring now to FIG. 20, the fourth embodiment of the present invention will be described in detail.

This fourth embodiment is a modification of the third embodiment which is also directed to a Web page image formation scheme which can be suitably adapted to the advertisement posting scheme of the present invention described above.

In the fourth embodiment, instead of providing the Web page image database 221 and the Web page image file storage area 223 in each Web page image formation server 201 as in FIG. 15, one Web page image database 231 and one Web page image file storage area 233 are shared by all the Web page image formation server 201 as shown in FIG. 20.

More specifically, in FIG. 20, the Web page image database 231 and the Web page image file storage area 233 to be shared are commonly connected with all the Web page image formation servers 201 through a computer network 235, such that they are commonly accessible from each Web page image formation server 201 through the computer network 235.

With this sharing configuration, it becomes possible to operate the Web page image formation server 201 faster when there are many requests for the image formation of the same Web page. Also, in this case, the Web page image database 231 can be realized by utilizing the existing distributed database technique, and the Web page image file storage area 233 can be realized by utilizing the distributed file server technique.

Note that, in FIG. 20, the computer networks 203, 207 and 235 are conceptually different networks but can be realized by the same network in practice.

As described, according to the Web page image formation system of the fourth embodiment, the Web page image database and the Web page image file storage area can be connected through the computer network such that they can be shared by all the Web page image formation servers, so that there is no need to provide the Web page image database and the Web page image file storage area separately in each Web page image formation server and the system can be made more economical.

Figure 21:
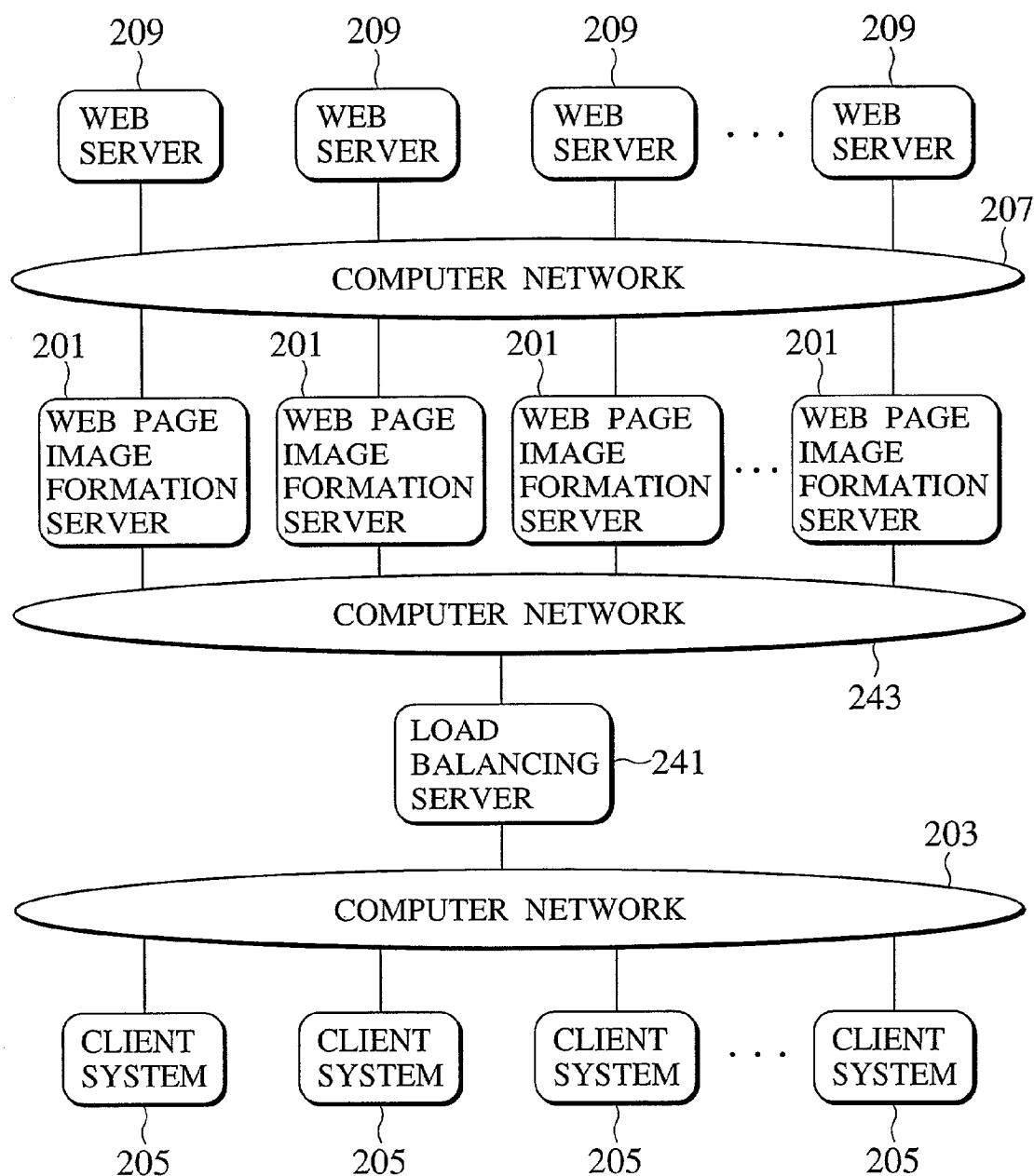
FIG. 21 is a block diagram showing an exemplary configuration of a Web page image formation system according to the fifth embodiment of the present invention.

Referring now to FIG. 21, the fifth embodiment of the present invention will be described in detail.

This fifth embodiment is also a modification of the third embodiment which is also directed to a Web page image formation scheme which can be suitably adapted to the advertisement posting scheme of the present invention described above.

In this fifth embodiment, as shown in FIG. 21, a load balancing server 241 is provided between the computer network 203 to which a plurality of client systems 205 are connected and a computer network 243 to which a plurality of Web page image formation servers 201 are connected. This load balancing server 241 distributes the Web page image requests from the client systems 205 among the Web page image formation servers according to the loaded states of the Web page image formation servers 201, and supplies them to the respective Web page image formation servers 201, so as to realize the load balancing among the Web page image formation servers 201.

Namely, when each Web page image formation server 201 is shared by a plurality of client systems 205 as in the third embodiment of FIG. 13, the load on each Web page image formation server 201 can be a potential problem, and this potential problem is resolved by providing the load balancing server 241 between the client system 205 and the Web page image formation servers 201 such that the requests from the client systems 205 are distributed according to the loaded state of each Web page image formation server 201.

In the fifth embodiment of FIG. 21, the load balancing server 241 registers the address of each Web page image formation server 201 in advance and records the number of image formation processings to be executed by each Web page image formation server 201 in a form of a work allotment table.

When the Web page image request from the client system 205 is received, the load balancing server 241 selects one Web page image formation server 201 with the least number of image formation processings from the work allotment table, and increment the number of image formation processings for this selected Web page image formation server 201 by one. Then, the load balancing server 241 transfers the Web page image request from the client system 205 to this selected Web page image formation server 201 so as to request the image formation processing. When the processing of that Web page image formation server 201 is completed and the processing result is received, the load balancing server 241 transfers the processing result to the client system 205, and decrements the number of image formation processings for that Web page image formation server 201 by one in the work allotment table.

In the fifth embodiment described above, the requests from the client systems 205 are distributed according to the number of image formation processings to be executed by each Web page image formation server 201, but the present invention is not necessarily limited to this case, and can be realized by utilizing the existing load balancing scheme such as that for distributing requests according to the CPU load of a machine constituting each Web page image formation server 201.

It is also possible to combine the load balancing feature of this fifth embodiment with the data sharing feature of the fourth embodiment described above as described, according to the Web page image formation system of the fifth embodiment, the loaded state of each Web page image formation server is monitored and the Web page image requests from the client system are distributed among the Web page image formation servers according to their loaded states, so that it is possible to realize the load balancing among the Web page image formation servers.

It is to be noted that the Web page image formation system of the third, fourth and fifth embodiments described above can be suitably adapted to the advertisement posting scheme of the first and second embodiments described above, by using each Web server 209 as the WWW server 14 of FIG. 2 and each client system 205 as the user terminal 21 of FIG. 2, or in other words, by providing the Web page image formation servers 201 in the network 31 of FIG. 2.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the user terminal of the first and second embodiments can be conveniently implemented in a form of a software package. Also, the Web page image formation server of the third, fourth and fifth embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for posting advertisements, comprising the steps of:
   (a) displaying multiple Web pages on a display screen of a comprehensive information viewing device, each of the Web pages being displayed at a position determined by its Web page attribute information;
   (b) displaying a first advertisement which relates to Web page attribute information of one of the Web pages on the display screen of the comprehensive information viewing device, wherein the advertisement is displayed in a vicinity of the Web page;
   (c) displaying overlay information between the Web page and another one of the Web pages, the overlay information representing a number of users or user attribute information of users who made transitions between the Web page and the other one of the Web pages; and
   (d) displaying a second advertisement which relates to overlay attribute information of the overlay information in a vicinity of the overlay information.

2. The method of claim 1, wherein the step (c) displays the overlay information in animation, and the step (b) displays the first advertisement in animation.

3. The method of claim 1, further comprising the step of determining a position for displaying the second advertisement according to user attribute information of the overlay information displayed on the display screen.

4. The method of claim 1, further comprising the step of searching the multiple Web pages to be displayed by the step (a) according to a user input at the comprehensive information viewing device.

5. The method of claim 1, further comprising the step of: obtaining images of the multiple Web pages to be displayed by the step (a) at a plurality of Web page image formation devices and providing the images to the comprehensive information viewing device in response to Web page image requests from the comprehensive information viewing device, wherein the Web page image formation devices are provided on a network to which the comprehensive information viewing device is connected.

6. The method of claim 5, wherein at the obtaining step, the Web page image formation devices obtain the images requested by the comprehensive information viewing device by acquiring data of the multiple Web page from Web servers and carrying out image formation processing for the multiple Web pages, by using existing Web browsers respectively provided in the Web page image formation devices.

7. The method of claim 5, wherein at the obtaining step, each Web page image formation device has a Web page image storing unit for storing existing images of some Web pages in advance, and obtains each image by reading out the existing image stored in the Web page image storing unit when an image of a Web page requested from the comprehensive information viewing device is stored in the Web page image storing unit.

8. The method of claim 5, wherein at the obtaining step, the plurality of Web page image formation devices share a common Web page image storing unit for storing existing images of some Web pages in advance which is provided on a network to which the plurality of Web page image formation devices are connected, and obtain each image by reading out the existing image stored in the common Web page image storing unit when an image of a Web page requested from the comprehensive information viewing device is stored in the common Web page image storing unit.

9. The method of claim 5, further comprising the step of distributing the Web page image requests from the comprehensive information viewing device among the plurality of Web page image formation devices according to a loaded state of each Web page image formation device, at a load balancing server provided between the comprehensive information viewing device and the plurality of Web page image formation devices.

10. The method of claim 1, wherein the step (c) displays the overlay information in particles, each particle representing each user who made a transition between the Web pages.

11. A system for posting advertisements, comprising:
   a Web page display unit configured to display multiple Web pages on a display screen of a comprehensive information display device, each of the Web pages being displayed at a position determined by its Web page attribute information;
   an overlay display unit configured to display overlay information between two of the Web pages, the overlay information representing a number or user attribute information of users who made transitions between the two of the Web pages; and
   an advertisement display unit configured to display a first advertisement which relates to Web page attribute information of one of the two Web pages in a vicinity of the one of the two Web pages and a second advertisement which relates to overly attribute information of the overlay information in a vicinity of the overlay information.

12. The system of claim 11, wherein the overlay display unit is configured to display the overlay information in animation, and the advertisement display unit is configured to display the advertisements in animation.

13. The system of claim 11, wherein the advertisement display unit is configured to determine a position for displaying the second advertisement according to user attribute information of the overlay information displayed on the display screen.

14. The system of claim 11, further comprising:
a search unit configured to search the multiple Web pages to be displayed by the Web page display unit according to a user input at the comprehensive information viewing device.

15. The system of claim 11, further comprising:
a plurality of Web page image formation devices, provided on a network to which the comprehensive information viewing device is connected, configured to obtain images of the multiple Web pages to be displayed by the Web page display unit and provide the images to the comprehensive information viewing device in response to Web page image requests from the comprehensive information viewing device.

16. The system of claim 15, wherein the Web page image formation devices obtain the images requested by the comprehensive information viewing device by acquiring data of the multiple Web page from Web servers and carrying out image formation processing for the multiple Web pages, by using existing Web browsers respectively provided in the Web page image formation devices.

17. The system of claim 15, wherein each Web page image formation device has a Web page image storing unit for storing existing images of some Web pages in advance, and obtains each image by reading out the existing image stored in the Web page image storing unit when an image of a Web page requested from the comprehensive information viewing device is stored in the Web page image storing unit.

18. The system of claim 15, wherein the plurality of Web page image formation devices share a common Web page image storing unit for storing existing images of some Web pages in advance which is provided on a network to which the plurality of Web page image formation devices are connected, and obtain each image by reading out the existing image stored in the common Web page image storing unit when an image of a Web page requested from the comprehensive information viewing device is stored in the common Web page image storing unit.

19. The system of claim 15, further comprising:
a load balancing server, provided between the comprehensive information viewing device and the plurality of Web page image formation devices, configured to distribute the Web page image requests from the comprehensive information viewing device among the plurality of Web page image formation devices according to a loaded state of each Web page image formation device.

20. The system of claim 11, wherein the overlay display unit displays the overlay information in particles, each particle representing each user who made a transition between the one of the Web pages and the other one of the Web pages.

21. A comprehensive information display device, comprising:
a Web page display unit configured to display multiple Web pages on a display screen, each of the Web pages being displayed at a position determined by its Web page attribute information;
an overlay display unit configured to display overlay information between two of the multiple Web pages, the overlay information representing a number or user attribute information of users who made transitions between the two of the Web pages; and
an advertisement display unit configured to display a first advertisement which relates to attribute information of one of the two of the web pages in a vicinity of
the one of the two of the Web page and a second advertisement which relates to overly attribute information of the overlay information in a vicinity of the overlay information.

22. The device of claim 21, wherein the overlay display unit is configured to display the overlay information in animation, and the advertisement display unit is configured to display the advertisements in animation.

23. The device of claim 21, wherein the advertisement display unit is configured to determine a position for displaying the second advertisement according to user attribute information of the overlay information displayed on the display screen.

24. The device of claim 21, further comprising:
a search unit configured to search the multiple Web pages to be displayed by the Web page display unit according to a user input at the comprehensive information viewing device.

25. The device of claim 21, wherein the overlay display unit displays the overlay information in particles, each particle representing each user who made a transition between the the two of the Web pages.

26. A computer usable medium having computer readable program codes embodied therein for causing a computer to function as a comprehensive information display device, the computer readable program codes comprising:
a first computer readable program code for causing said computer to display multiple Web pages on a display screen of the comprehensive information display device, each of the Web pages being displayed at a position determined by its Web page attribute information; and
a second computer readable program code for causing said computer to display overlay information between two of the multiple Web pages, the overlay information representing a number or user attribute information of users who made transitions between the two of the Web pages; and
a third computer readable program code for causing said computer to display a first advertisement which relates to Web page attribute information of one of the Web pages in a vicinity of the one of the Web pages and a second advertisement which relates to overlay attribute information of the overlay information in a vicinity of the overlay information.

27. The computer usable medium of claim 26, wherein the second computer readable program code causes said computer to display the overlay information in animation, and the third computer readable program code causes said computer to display the advertisements in animation.

28. The computer usable medium of claim 26, wherein the third computer readable program code causes said computer to determine a position for displaying the second advertisement according to user attribute information of the overlay information displayed on the display screen.

29. The computer usable medium of claim 26, further comprising:
a fourth computer readable program code for causing said computer to search the multiple Web pages to be displayed by the first computer readable program code according to a user input at the comprehensive information viewing device.

30. The computer usable medium of claim 26, wherein the second computer readable program code displays the overlay information in particles, each particle representing each user who made a transition between the two of the Web pages.

* * * * *